United States Patent
Roozbeh et al.

(10) Patent No.: US 12,425,351 B2
(45) Date of Patent: Sep. 23, 2025

(54) METHOD AND SYSTEM FOR EFFICIENT INPUT/OUTPUT TRANSFER IN NETWORK DEVICES

(71) Applicant: Telefonaktiebolaget LM Ericsson (publ), Stockholm (SE)

(72) Inventors: Amir Roozbeh, Stockholm (SE); Alireza Farshin, Stockholm (SE); Dejan Kostic, Solna (SE); Gerald Q Maguire, Jr., Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 18/253,773

(22) PCT Filed: Nov. 20, 2020

(86) PCT No.: PCT/SE2020/051108
§ 371 (c)(1),
(2) Date: May 19, 2023

(87) PCT Pub. No.: WO2022/108498
PCT Pub. Date: May 27, 2022

(65) Prior Publication Data
US 2024/0015108 A1    Jan. 11, 2024

(51) Int. Cl.
*H04L 47/43* (2022.01)
*H04L 47/2483* (2022.01)

(52) U.S. Cl.
CPC .......... *H04L 47/43* (2022.05); *H04L 47/2483* (2013.01)

(58) Field of Classification Search
None
See application file for complete search history.

(56) References Cited

U.S. PATENT DOCUMENTS 5,136,582 A * 8/1992 Firoozmand ........ H04L 47/6255
370/906
6,092,127 A 7/2000 Tausheck
(Continued)

FOREIGN PATENT DOCUMENTS

WO  2001067237 A2  9/2001
WO  02/065711 A1  8/2002
(Continued)

OTHER PUBLICATIONS

U.S. Appl. No. 18/253,772, PCT/SE2020/051107, Pending.
(Continued)

*Primary Examiner* — Eunsook Choi
(74) *Attorney, Agent, or Firm* — Nicholson De Vos Webster & Elliott LLP

(57) ABSTRACT

Methods and systems for selective access to a processing unit are described. An electronic device that is coupled with the processing unit for processing packets is described. The electronic device is operative to receive a packet; determine based on one or more attributes of the packet that the packet is to be split; and responsive to determining that the packet is to be split, splitting the packet into a first portion and a second portion, where the first portion is to be processed by the processing unit and the second portion is to be stored without being processed by the processing unit; sending the first portion of the packet toward the processing unit for processing; and storing the second portion of the packet.

18 Claims, 13 Drawing Sheets

(56) References Cited

U.S. PATENT DOCUMENTS

| | | | |
|---|---|---|---|
| 6,279,052 B1 | 8/2001 | Upadrastra | |
| 7,552,232 B2 | 6/2009 | Helmer et al. | |
| 7,684,347 B2* | 3/2010 | Merkey | H04L 43/02 370/428 |
| 8,494,000 B1* | 7/2013 | Nadkarni | H04L 43/028 709/224 |
| 8,732,351 B1 | 5/2014 | Chudgar et al. | |
| 8,732,352 B1 | 5/2014 | Herbeck | |
| 8,804,751 B1* | 8/2014 | Poole | H04L 49/90 370/413 |
| 9,313,140 B2* | 4/2016 | Matthews | H04L 47/28 |
| 9,444,723 B1* | 9/2016 | Di Benedetto | H04L 45/14 |
| 9,444,914 B2* | 9/2016 | Izenberg | H04L 47/2433 |
| 9,973,402 B2* | 5/2018 | Satoda | H04L 65/80 |
| 10,541,947 B2 | 1/2020 | Melman et al. | |
| 10,567,298 B1* | 2/2020 | Roskind | H04L 43/0852 |
| 11,847,507 B1 | 12/2023 | Borkovic | |
| 11,855,903 B2* | 12/2023 | Meier | H04L 12/40163 |
| 11,956,075 B2* | 4/2024 | Yu | H04L 1/0041 |
| 2004/0066746 A1 | 4/2004 | Matsunaga | |
| 2004/0076161 A1 | 4/2004 | Lavian et al. | |
| 2005/0232303 A1 | 10/2005 | Deforche et al. | |
| 2006/0107122 A1 | 5/2006 | Kasahara | |
| 2006/0281451 A1 | 12/2006 | Zur | |
| 2007/0220179 A1 | 9/2007 | Hanaoka et al. | |
| 2007/0255802 A1 | 11/2007 | Aloni et al. | |
| 2008/0005296 A1 | 1/2008 | Lee et al. | |
| 2008/0091851 A1 | 4/2008 | Sierra | |
| 2008/0137568 A1 | 6/2008 | Ho et al. | |
| 2009/0089454 A1 | 4/2009 | Huggahalli et al. | |
| 2009/0182969 A1 | 7/2009 | Norgaard et al. | |
| 2010/0238946 A1 | 9/2010 | Lu | |
| 2010/0325391 A1 | 12/2010 | Talla | |
| 2011/0258282 A1 | 10/2011 | Cantu et al. | |
| 2012/0301118 A1 | 11/2012 | Ju | |
| 2013/0114413 A1* | 5/2013 | Song | H04L 49/9042 370/237 |
| 2013/0191600 A1 | 7/2013 | Kuesel et al. | |
| 2014/0281349 A1 | 9/2014 | Peters | |
| 2015/0081726 A1* | 3/2015 | Izenberg | G06F 16/2471 707/755 |
| 2015/0149613 A1 | 5/2015 | Kakadia et al. | |
| 2015/0163175 A1 | 6/2015 | Cardona et al. | |
| 2015/0227312 A1 | 8/2015 | Feehrer et al. | |
| 2016/0321153 A1 | 11/2016 | Zhang et al. | |
| 2017/0091108 A1 | 3/2017 | Arellano et al. | |
| 2017/0318031 A1 | 11/2017 | Zhou et al. | |
| 2017/0373974 A1* | 12/2017 | Wood | H04L 67/63 |
| 2018/0006970 A1 | 1/2018 | Browne et al. | |
| 2018/0077075 A1* | 3/2018 | Sreenivasan | H04L 47/365 |
| 2018/0159803 A1 | 6/2018 | Cornett et al. | |
| 2018/0270197 A1* | 9/2018 | Subramanian | H04L 49/90 |
| 2019/0097938 A1 | 3/2019 | Talla et al. | |
| 2020/0204657 A1 | 6/2020 | Khan et al. | |
| 2020/0259763 A1 | 8/2020 | Guim Bernat et al. | |
| 2022/0138498 A1 | 5/2022 | Abelha et al. | |

FOREIGN PATENT DOCUMENTS

| | | |
|---|---|---|
| WO | 2014/092551 A1 | 6/2014 |
| WO | 2017/052909 A1 | 3/2017 |

OTHER PUBLICATIONS

U.S. Appl. No. 18/253,773, PCT/SE2020/051108, Pending.
European search report and Search Opinion, EP App. No. 20962608.4, May 31, 2024, 11 pages.
Final Office Action, U.S. Appl. No. 18/253,772, Jun. 14, 2024, 22 pages.
International Search Report and Written Opinion for Application No. PCT/SE2020/051107, Jun. 9, 2021, 13 pages.
International Search Report and Written Opinion for Application No. PCT/SE2020/051108, May 28, 2021, 15 pages.
Non-Final Office Action, U.S. Appl. No. 18/253,772, Feb. 29, 2024, 19 pages.
Supplementary European Search Report and Search Opinion, EP App. No. 20962607.6, Apr. 2, 2024, 9 pages.
International Preliminary Report on Patentability, PCT App. No. PCT/SE2020/051107, Jun. 1, 2023, 10 pages.
International Preliminary Report on Patentability, PCT App. No. PCT/SE2020/051108, Jun. 1, 2023, 12 pages.
Non-Final Office Action, U.S. Appl. No. 18/253,772, Sep. 27, 2024, 23 pages.
Notice of Allowance, U.S. Appl. No. 18/253,772, Feb. 25, 2025, 10 pages.

* cited by examiner

METHOD AND SYSTEM FOR EFFICIENT INPUT/OUTPUT TRANSFER IN NETWORK DEVICES

CROSS-REFERENCE TO RELATED APPLICATIONS

This application is a National stage of International Application No. PCT/SE2020/051108, filed Nov. 20, 2020, which is hereby incorporated by reference.

TECHNICAL FIELD

Embodiments of the invention relate to the field of packet networking; and more specifically, to the efficient input/output transfer in network devices.

BACKGROUND

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network device receives input data, processes the data, and outputs the data following its processing. For example, a network device may receive network packets, and output network packets following their processing. A network device includes one or more processing units on which code is executed for processing the input data. The processing units are coupled with a network interface. A network interface (NI) is an electronic device operative to establish network connections (to transmit and/or receive data using propagating signals) with other electronic devices. For example, a NI receives the data from other network devices, transfers the data to the processing unit(s) for processing, and outputs the processed data towards other network devices.

Different approaches exist for transferring data to a processing unit. In a first approach data can be stored in a main memory of the processing unit (e.g., using a Direct Memory Access (DMA) mechanism) before being retrieved by the processing unit for processing. The main memory is typically coupled with the processing unit through a communication bus (e.g., Double Data Rate (DDR) bus). Thus, main memory access is an expensive operation. In another approach data is directly sent to the processing unit. In one example, the data is sent to a cache of the processing unit through a direct cache access mechanism. Technologies such as Intel Data Direct I/O (DDIO) technology, or/and ARM Cache Stashing are examples of technologies that allow sending data to a last level cache (LLC) or other cache levels of the processing unit. Direct cache access allows to avoid the storage of data in main memory before processing by the processing unit. In another example, data can be sent directly to registers of the processing unit, as opposed to a cache of the processing unit.

SUMMARY

The embodiments described herein present a solution for efficient input/output transfer in network devices. The solution integrates to network and electronic devices the ability to selectively transfer packets or portions of packets to a processing unit. The solution advantageously integrates the notion of partial processing of a packet instead of an entire packet in a processing unit based on attributes of the packet. The solution advantageously integrates the notion of prioritizing packets of a flow over other packets based on their attributes for direct access to a processing unit. The solution enables reduction of the amount of storage and bandwidth to this storage needed for direct access to a processing unit. The solutions enable an efficient processing of the packets, by directly sending the packets to the processing unit, and/or sending portions of the packets to the processing unit.

One general aspect includes a method in an electronic device that is coupled with a processing unit for processing packets, the method comprising: receiving a packet; determining based on one or more attributes of the packet that the packet is to be split; and responsive to determining that the packet is to be split, splitting the packet into a first portion and a second portion, wherein the first portion is to be processed by the processing unit and the second portion is to be stored without being processed by the processing unit; sending the first portion of the packet toward the processing unit for processing; and storing the second portion of the packet.

In one general aspect, the method further comprises responsive to determining that the packet is to be split, generating an identifier of the packet; and adding the identifier to the first portion.

In one general aspect, the method further comprises responsive to determining that the packet is to be split, storing information related to the splitting of the packet including the identifier.

In one general aspect, the method further comprises receiving an indication resulting from processing the first portion of the packet in the processing unit; determining that the indication includes a processed first portion of the packet resulting from the processing of the first portion by the processing unit; responsive to determining that the indication includes a processed first portion of the packet, merging the processed first portion of the packet with the second portion of the packet to obtain a processed packet; and outputting the processed packet.

In one general aspect, merging the processed first portion of the packet with the second portion of the packet is performed based on the information related to splitting of the packet.

In one general aspect, the method further comprises determining based on the indication that the packet is dropped; and responsive to determining that the packet is dropped, removing the second portion of the packet from storage.

In one general aspect, sending the first portion to the processing unit for processing includes directly sending the first portion to the processing unit.

In one general aspect, storing the second portion includes storing the second portion in a main memory associated with the processing unit.

In one general aspect, sending the first portion to the processing unit for processing includes storing the first portion to a main memory associated with the processing unit.

In one general aspect, storing the second portion includes storing the second portion in a buffer of the electronic device.

In one general aspect, a machine-readable medium comprising computer program code which when executed by a computer carries out the method described above.

In one general aspect, an electronic device to be coupled with a processing unit for processing packets received through the NI device is described, the NI device comprising: a non-transitory machine-readable storage medium that provides instructions that, if executed by a processor, will cause the NI device to perform operations comprising, receiving a packet; determining based on one or more attributes of the packet that the packet is to be split; and responsive to determining that the packet is to be split, splitting the packet into a first portion and a second portion, wherein the first portion is to be processed by the processing unit and the second portion is to be stored without being processed by the processing unit; sending the first portion of the packet toward the processing unit for processing; and storing the second portion of the packet.

In one general aspect, the operations further comprise responsive to determining that the packet is to be split, generating an identifier of the packet; and adding the identifier to the first portion.

In one general aspect, the operations further comprise responsive to determining that the packet is to be split, storing information related to the splitting of the packet including the identifier.

In one general aspect, the operations further comprise receiving an indication resulting from processing the first portion of the packet in the processing unit; determining that the indication includes a processed first portion of the packet resulting from the processing of the first portion by the processing unit; responsive to determining that the indication includes a processed first portion of the packet, merging the processed first portion of the packet with the second portion of the packet to obtain a processed packet; and outputting the processed packet.

In one general aspect, merging the processed first portion of the packet with the second portion of the packet is performed based on the information related to splitting of the packet.

In one general aspect, the operations further comprise determining based on the indication that the packet is dropped; and responsive to determining that the packet is dropped, removing the second portion of the packet from storage.

In one general aspect, sending the first portion to the processing unit for processing includes directly sending the first portion to the processing unit.

In one general aspect, storing the second portion includes storing the second portion in a main memory associated with the processing unit.

In one general aspect, sending the first portion to the processing unit for processing includes storing the first portion to a main memory associated with the processing unit.

In one general aspect, storing the second portion includes storing the second portion in a buffer of the electronic device.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
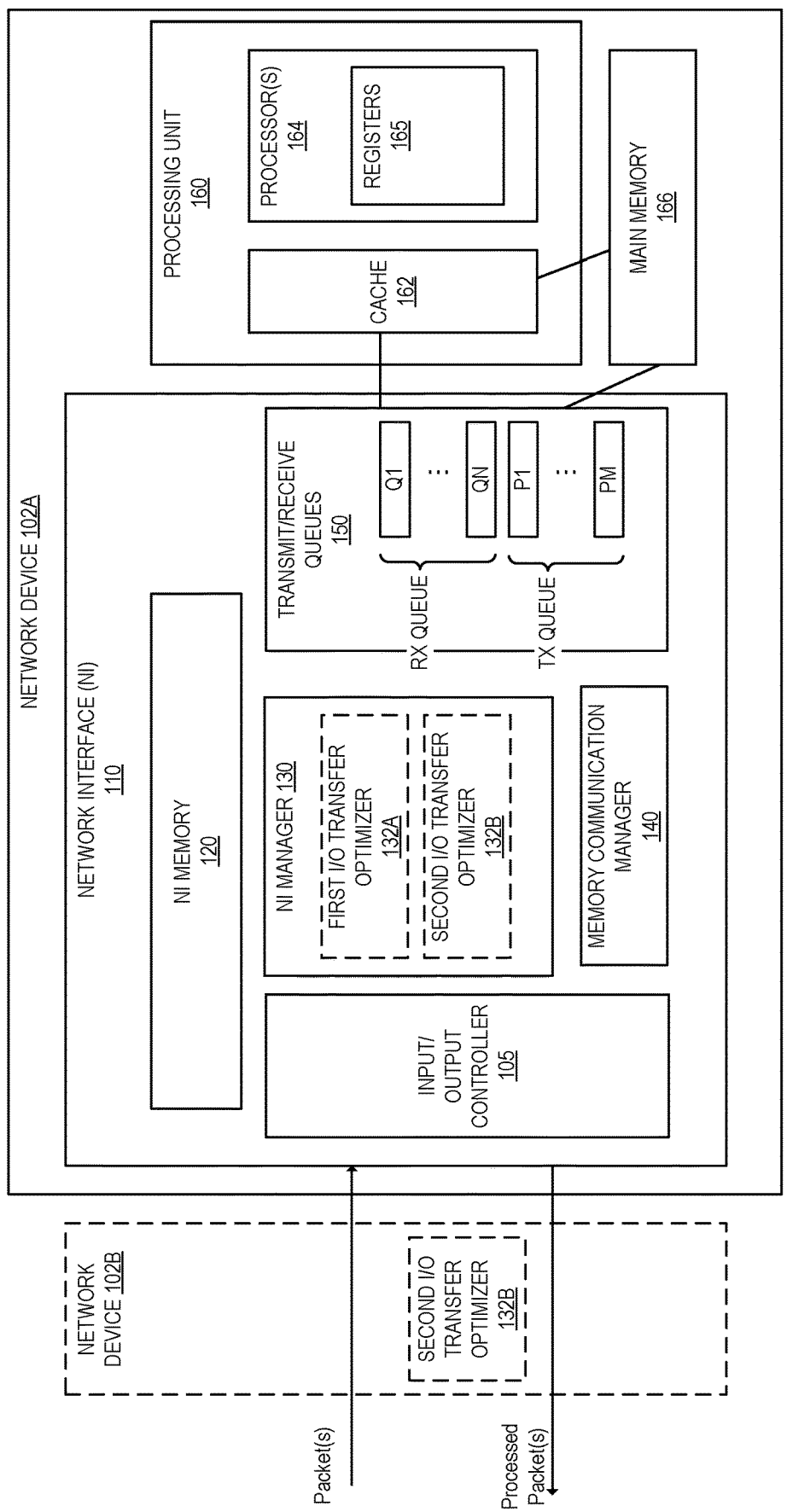
FIG. 1A illustrates a block diagram of a system 100 for efficient I/O transfer to a processing unit, in accordance with some embodiments.

The following description describes methods and systems for efficient input/output transfer in network devices. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While different approaches exist for input/output transfer to/from a processing unit of a network device, these approaches (e.g., direct cache access, or main memory access) have limited efficiency and several disadvantages. A cache is a limited resource that is used to store code/data and I/O. In approaches that rely on direct cache access, different applications running on the computing unit have different requirements, e.g., some need more cache for I/O and some more for code/data, making it hard to have a one-size-fits-all solution for dividing the cache between I/O and code/data. Therefore, current approaches use a limited portion of the cache for I/O, resulting in hiding the benefits of the direct access-approach or in making the portion of the cache that is reserved for direct-access a bottleneck. This problem is particularly significant in network devices of packet networks where the packet arrival rate can be faster than the packet processing rate. In this case, new incoming packets repeatedly evict previously loaded packets (i.e., not-yet-processed or already-processed packets) in the limited portion of the cache that is used for direct access. Consequently, the processing unit of the network device has to load not-yet-processed packets from the main memory rather than from the cache, and the processed packets needs to be loaded from the main memory, instead of being directly output from the processing unit thereby missing the benefits of direct cache access. Further, existing approaches do not allow to selectively send data directly to the processing unit or to explicitly bypass this direct transmission. In other words, when direct access to the processing unit (e.g., direct cache access or direct register access) is enabled, all data/packet(s) is sent to the processing unit through this process. Alternatively, when direct access is not enabled, all data is sent to the processing unit through the main memory.

The embodiments described herein present efficient methods and systems of I/O transfer to a processing unit of a network device. Embodiments described herein allow to selectively send some packets directly to the processing unit while sending other packets to the main memory for processing by the processing unit. The selective direct transfer of packets to the processing unit is performed based on attributes of the packets and can be dynamically updated. Embodiments described herein provide a mechanism for adapting the capacity and/or bandwidth of on-chip or off-chip storage (e.g., cache or registers) dedicated to direct access of the processing unit. The capacity and/or bandwidth is adapted according to the traffic volume. Additionally or alternatively, the capacity and/or bandwidth is adapted according to system performance metrics such as misses at NI or misses at the storage. Some embodiments herein present a mechanism for selectively sending a portion of a packet to the processing unit while storing the remaining portion(s) of that packet without sending that remaining portion(s) to the processing unit. The remaining portion can be stored in a storage of the electronic device that performs the split of the packet(s), or alternatively stored in a main memory of the processing unit. Multiple embodiments will be described below in further detail.

FIG. 1A illustrates a block diagram of a system 100 for efficient I/O transfer to a processing unit, in accordance with some embodiments. The system 100 includes a network device 102A. The network device 102A includes a processing unit 160, a main memory 166, and a network interface (NI) 110. The network device 102A is operative to be coupled with one or more other network devices through the NI 110. In some embodiments, the network device 102A can be coupled with network device 102B.

The network interface 110 is operative to establish network connections (to transmit and/or receive data using propagating signals) for the network device 102A with other electronic devices (e.g., with ND 102B). For example, the NI (or the NI in combination with the processor unit executing code) may perform any formatting, coding, or translating to allow the network device to send and receive data whether over a wired and/or a wireless connection.

The NI 110 includes an input/output (I/O) controller 105 that is operative to send and receive data (e.g., packets) from an external electronic device. The I/O controller 105 may facilitate in connecting the network device to other electronic devices allowing them to communicate via wire through plugging in a cable to a physical port connected to the controller. In some embodiments, the I/O controller 105 is a Media Access Controller (MAC). In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). The NI 110 includes an NI manager 130. The NI manager 130 is operative to perform multiple tasks that may include packet classification, packet filtering, and scheduling. For example, the NI manager 130 is operative to decide how a packet is distributed among available receive queues, RX queues Q1-QN. These queues are used to store packets/data that are to be processed by the processing unit 160. In some embodiments, receive side scaling (RSS) mechanism can be used to distribute/schedule data to the RX queues Q1-QN. RSS is a network driver technology that enables the efficient distribution of network receive packets across multiple RX queues based on the hash of different fields of a packet. In some embodiments, NI 110 provides advanced flow-steering techniques which support advanced filtering of packets. These advanced filtering techniques enable the NI to direct the received packets to different queues based on a rule. The NI 110 further includes NI memory 120. NI memory 120 is a non-transitory computer readable storage medium included in the NI that can act as a buffer for storing data. In some embodiments, data is stored in the NI memory 120 when other components of NI are busy and cannot perform the tasks associated with this data. As will be described in further detail below, in some embodiments, the NI memory 120 is operative to store portions of packets that are not sent to the processing unit 160 for processing. The NI 110 also includes transmit queues, TX queues P1-PM. The TX queues P1-PM receive processed data/packets from the processing unit 160 to be output from the NI 110. The TX queues P1-PM can receive packets/data from the main memory 166 and/or from the cache 162.

The NI 110 further includes a memory communication manager 140. The memory communication manager is operative to transfer packets/data to and from the memory of a processing unit 160, e.g., main memory 166. Two mechanisms can be used for transferring data/packets from the NI 110 to the processing unit 160, 1) a first technique where data/packets are stored in main memory 166, 2) directly sending packets/data to the processing unit 160. The latter technique is sometimes referred to as direct cache access, DDIO, or cache stashing. When an NI sends data/packets directly to the processing unit 160, the data/packets are directly stored in the cache of the processing unit 160, e.g., cache 162, or alternatively the data packets are directly sent to registers, e.g., registers 165, of the processing unit 160. Direct transmission of data/packets to the processing unit 160 is performed without transmission of the data/packets to the main memory 166. The data/packets are then processed by the processor(s) 164 from the cache 162 or from the registers 165. Directly sending the packets/data to the processing unit 160 enables a faster processing of the data/packets than when the packets/data are sent to the main memory 166 for processing in the processing unit 160. When the data is stored in the main memory 166, the data is retrieved by the processing unit 160 and stored in the cache before being processed by the processor(s) 164 or retrieved by the processing unit 160 and stored directly in registers 165 to be processed by the processor(s) 164.

The processing unit 160 includes one or more processor(s) 164 that are coupled with non-transitory computer readable storage media, such as cache 162, and a main memory 166. During operation, the processor(s) 164 execute software to instantiate one or more sets of one or more applications. The application(s) process data/packets received from the NI 110. As described above the data can provide directly from the NI 110, e.g., from one or more RX queues Q1-QN, or from the main memory 166. In some embodiments, the NI 110 is connected to the processing unit 160, and the main memory 166 through a communication bus.

In some embodiments, the NI manager 130 includes a first packet transfer optimizer 132A. In some embodiments, the NI manager 130 includes a second packet transfer optimizer 132B. In some embodiments, the second packet transfer optimizer 132B can be included in a separate network device 102B. The ND 102B is an electronic device that is coupled with the network device 102A. For example, in some embodiments, the second packet transfer optimizer 132B is included in the ND 102B and the first packet transfer optimizer 132A is included in the NI 110 of the ND 102A. In this embodiments, the packets received at the ND 102B are processed according to embodiments described with respect to the second packet transfer optimizer 132B before being processed in the ND 102A according to embodiments described with respect to the first packet transfer optimizer 132A. In some embodiments, the second packet transfer optimizer 132B is included in the ND 102A regardless of whether it is included in the ND 102B. In some embodiments, the NI 110 includes a single one of the packet transfer optimizers 132A-B, in other embodiments, the NI 110 includes both of the packet transfer optimizers 132A-B. The first packet transfer optimizer 132A and the second packet transfer optimizer 132B can be used independently or in combination.

The operation of the first packet transfer optimizer 132A and the second packet transfer optimizer 132B will be described in further detail below with respect to FIGS. 1B-5. In the following description similar reference number correspond to similar components.

Selective Direct Access to Processing Unit of a Network Device

The embodiments herein present methods and systems for selective direct access to a processing unit. In one embodiment, the NI 110 receives one or more packets of a flow. The NI 110 determines based on attributes of the packets that the packets are to be directly sent to the processing unit. In response to determining that the packets are to be directly sent to the processing unit, they are directly sent to the processing unit for processing. In one embodiment, the packets are stored in a cache of the processing unit. Alternatively, or additionally, the packets are stored in registers 165 of the processing unit. The NI can receive one or more packets of another flow. The NI 110 determines based on one or more attributes of this other flow of packets that the packets are not to be directly sent to the processing unit. The NI 110 sends the packets of the other flow to be stored in a main memory associated with the processing unit before being processed by the processing unit. Thus, the embodiments present a method and a system for selectively sending some packets received at an NI directly to the processing unit, while sending other packets to the main memory of the processing unit. This allows for an efficient utilization of the direct access to the processing unit. For example, the embodiments, allow for an efficient use of the cache of the processing unit for I/O transfer. In addition, the portion of the resources that is reserved for direct access (e.g., cache, registers, queues of the NI) can be dynamically updated.

Figure 1B:
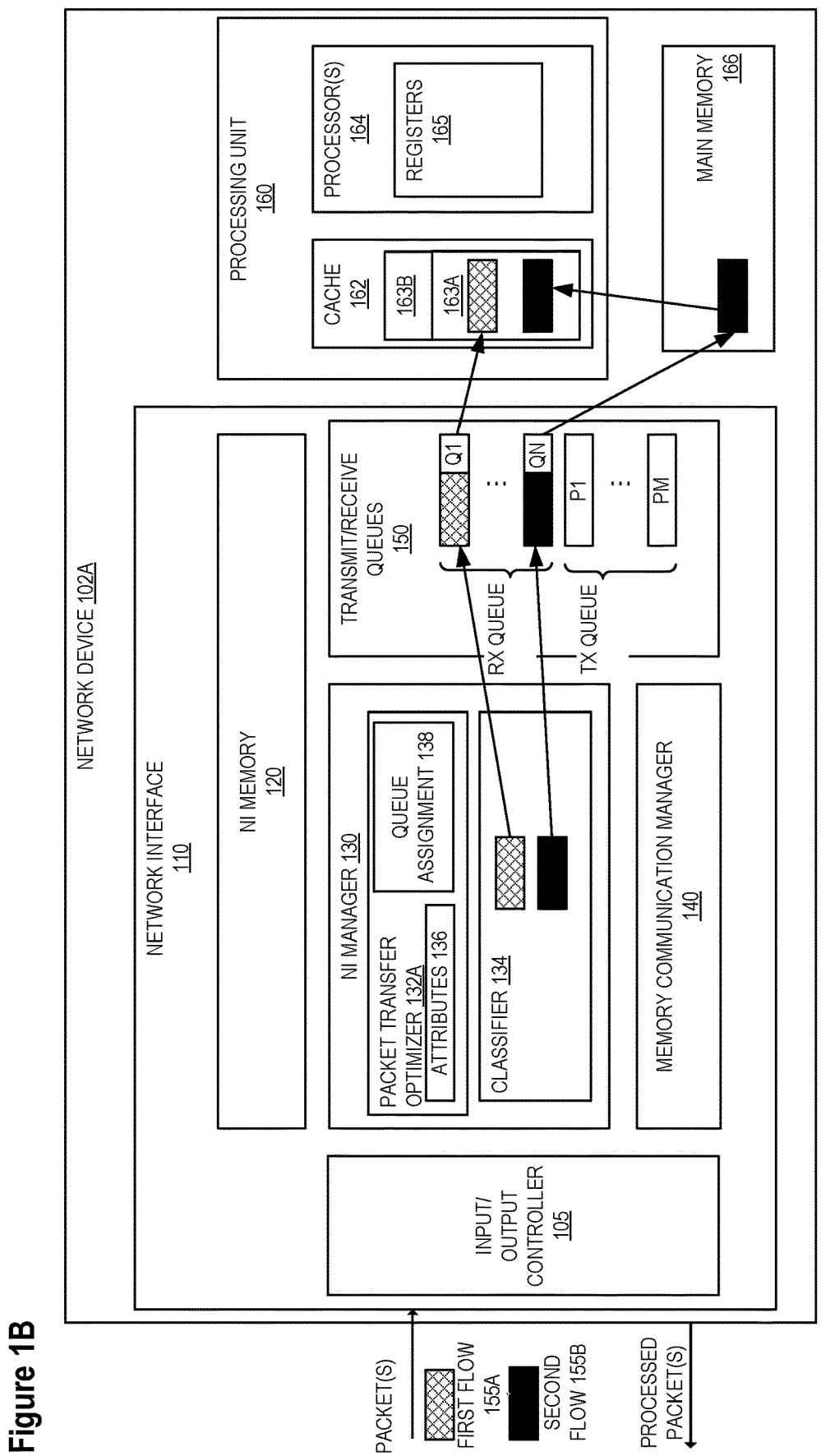
FIG. 1B illustrates a block diagram of detailed a first packet transfer optimizer 132A that allows selective direct access to a processing unit, in accordance with some embodiments.

FIG. 1B illustrates a block diagram of detailed a first packet transfer optimizer 132A that allows selective direct access to a processing unit, in accordance with some embodiments. The first packet transfer optimizer 132A includes attributes 136, and a queue assignment data structure 138. The NI manager 130 includes the first packet transfer optimizer 132A and a classifier 134. The first packet transfer optimizer 132A is operative to receive configuration information that includes the attributes 136, and configure the NI manager 130 and the queues 150 to selectively transfer packets of flows directly to/from the processing unit 160.

For example, the packet transfer optimizer 132A may include a northbound interface that is used to communicate with the applications, system administrator, or a user to receive information for configuring the NI 110 (e.g., for configuring the queues 150 and the classifier 134). The information includes one or more attributes 136 that define one or more flows of traffic. The attributes allow to distinguish packets of traffic received at the NI 110 from other packets of traffic. These attributes can be used to generate a set of rules for a programmable classifier to distinguish flow(s) from other flows. A flow is a series of packets that have same attributes. Additionally or alternatively, the rules can be generated by observing/analyzing the flows received at the NI 110. For example, the NI 110 can automatically identify a flow after detecting that the flow is a heavy hitter. Thus, the packet transfer optimizer 132A may receive the attributes or automatically determine the attribute through an analysis of the received traffic. Further, the packet transfer optimizer 132A can include a southbound interface that is used to communicate with the modules of the NI 110. For example, the southbound interface allows the configuration of the classifier 134 and the queues 150. The configuration of the classifier 134 includes configuring the classifier to transfer one or more flows identified with the attributes to one or more queue that are assigned for those flows. The packet transfer optimizer 132A is also operative to configure a subset of the RX queues for sending data directly to the processing unit (i.e., to the cache 162 or register at processing unit while avoiding going through the main memory), and another subset of the RX queue(s) for transfer of data to the processing unit through the main memory. In some embodiments, the packet transfer optimizer 132A is also operative to configure a subset of the TX queues for receipt of data directly from the processing unit (i.e., from the cache or registers while avoiding going through the main memory), and another subset of the TX queue for receipt of data from the processing unit through the main memory. In some embodiments, there is no need to configure the subset of TX queue for direct receipt of data from the processing unit. In these embodiments, a processed packet can be added to a TX queue from the processing unit and output by the NI 110.

The packet transfer optimizer 132A includes a data structure, e.g., a table, that stores the queue assignments (i.e., the set of queues that have direct cache access enabled, and another set of queues that have main memory access-enabled (DMA-access)) and statistics regarding each queue (e.g., arrival rate and departure/processing rate for any given flow class). The statistic can be fetched from available agents/performance counters (not illustrated) in the NI 110. The queue assignment 138 can be included as an extension to the flow table stored at the NI 110 or as a separate table.

In a non-limiting example, the packet transfer optimizer 132A receives one or more attributes that define the first flow of packets 155A and an indication that the first flow of packets 155A is to be directly sent from the NI to the processing unit 160. In some embodiments, the indication is a priority level associated with the attributes. For example, the priority level can be a high priority that indicates that the flows identified with the attributes are to be prioritized over all other flows. The packet transfer optimizer 132A configures the classifier to forward the packets of the first flow 155A to the receive queue Q1. The packet transfer optimizer 132A also receives second attributes that identify the second flow 155B. The packet transfer optimizer 132A can receive an indication that the second flow 155B is to be sent to the processing unit 160 through the main memory 166. For example, the indication can be a priority level associated with the second attributes. For example, the priority level can be a low priority that indicates that the flows identified with the second attributes have a lesser priority than the high priority flows. The classifier is configured to forward the packets of the second flow 155B to another receive queue, e.g., QN that is different from RX queue Q1.

Further, the packet transfer optimizer 132A is operative to configure the queues for accessing the processing unit 160. A subset of queues, including the first queue Q1, is configured to send data directly to the processing unit 160. In some embodiments, sending data directly to the processing unit 160 includes sending the data to the cache 162 with a direct cache access mechanism while avoiding sending this data to the main memory first. Additionally or alternatively, in some embodiments, sending data directly to the processing unit 160 includes sending the data to registers 165 of the processing unit while avoiding sending this data to the main memory first. Another subset of queues, including RX queue QN, is configured to transmit data to the processing unit by storing the data in the main memory 166.

In operation, when a first packet of the first flow 155A is received at the network device 102A, the first packet of the first flow 155A is sent to the classifier 134 that transfers it to a RX queue, Q1 that is enabled to directly send the packet to the processing unit 160. The first packet is stored in the cache 162 without being stored in the main memory 166. The processing unit 160 processed the first packet in a processor 164 from the cache 162. When a second packet of the second flow 155B is received at the network device 102A, the second packet of the second flow 155B is sent to the classifier 134 that transfers it to a RX queue, QN that is enabled to store the packet in the main memory 166. The second packet is retrieved from the main memory 166 to be stored in the cache 162 for processing in the processing unit 160. Thus, the packets of the first flow are prioritized over the packets of the second flow. As a result of the classification that occurs in the NI manager 130, the packets of the first flow 155A are processed faster than the packets of the second flow 155B as a result of the direct transmission of the packets to the processing unit 160. While the embodiments herein are described with a first flow and a second flow, one of ordinary skill in the art would understand that a network device can receive multiple flows of packets. In some embodiments, each packet of these flows can be processed by the classifier according to configurations of the packet transfer optimizer 132A. The network device can prioritize one or more flows of packets over one or more other flows that it receives.

In some embodiments, the packet transfer optimizer 132A is further operative to inform the application that prioritized traffic is to be expected from RX queue Q1. If additional RX queues are configured to directly send data to the processing unit, the packet transfer optimizer 132A informs the application of these additional RX queues. In some embodiments, informing the application is an optional operation and can be skipped. In some embodiments, the packet transfer optimizer 132A can optionally be operative to decide and configure an application to employ interrupts or polling to fetch a packet from a given queue.

In some embodiments, a portion 163A of the cache 162 is dedicated to data received directly from the NI 110. In some embodiments, the portion 163A is less than the entire cache 162. In these embodiments, the cache includes another portion 163B that is dedicated to data received from the main memory 166, and/or used for storing data/code during operation of the processor(s). In some embodiments, the packet transfer optimizer 132A is operative to configure the cache 162 for updating the size of the portion 163A that is dedicated to direct access of the processing unit from the network interface. The size of the portion 163A can be updated based on the traffic that is to be sent directly to the processing unit 160. Additionally or alternatively, the capacity is adapted according to system performance metrics such as misses at NI or misses at cache. In some embodiments, the packet transfer optimizer 132A is operative to configure the bandwidth of off-chip and/or on-chip storage that are dedicated to direct access or memory access of the processing unit.

In some embodiments, the configuration of the cache can be done directly by packet transfer optimizer 132A. In these embodiments, the packet transfer optimizer 163A has information regarding the current configuration of cache (i.e., how much cache the processing unit has, from that how much is used for direct cache access, and how much is available for adjustment) and/or bandwidth of on-chip or off-chip storage. This information can be provided during an initialization phase and is kept and updated by the packet transfer optimizer 132A. In some embodiments, the packet transfer optimizer 132A can request the configuration of the cache and/or bandwidth of on-chip or off-chip storage from another component in the system that is responsible for controlling the cache and/or bandwidth. In these embodiments, the packet transfer optimizer 132A requests from the responsible component more space from the cache or changes in bandwidth of on-chip or off-chip storage. The component can secure more space and/or bandwidth or can ignore the request. Based on the response from the component, the packet transfer optimizer 132A performs one or more actions. When more space in the cache is allocated, the packet transfer optimizer can adjust other resources such as adding more queues for incoming high priority traffic. When the request for more cache space is denied, the packet transfer optimizer some possible actions could be informing prior network nodes to send less packet (aka PAUSE frame) or ask a scaler to scale up/out the resource.

In one embodiment, the packet transfer optimizer 132A determines a rate of receipt of the traffic that is configured to be directly transferred to the processing unit 160. The rate of receipt of this traffic can be determined based on performance counters at the NI 110. The packet transfer optimizer 132A further determines a processing rate of the packets that are assigned to queue(s) enabled for direct access to the processing unit 160. The processing rate of packets can be accessible through performance counters of the NI 110. Additionally or alternatively, the processing rate can be received from or determined based on feedback received from the processing unit 160. The packet transfer optimizer 132A may further determine a miss/hit rate for direct cache access traffic. The miss/hit rate can be obtained from system's I/O controller, memory controller, and/or performance counters available in the processing unit. The packet transfer optimizer 132A updates a size of the cache 162 that is dedicated to direct access of the processing unit (e.g., portion 163A) based on the rate of receipt of the packets and based on the rate of processing these packets. In some embodiments, the portion 163A is further updated based on the miss/hit rate at the NI and/or at the cache. In one exemplary embodiment, the rate of receipt and the processing rate are compared. When the rate of receipt is higher than the processing rate, i.e., packets are received faster than they are processed by the processing unit, the packet transfer optimizer 132A increases the capacity of the portion 163A. In addition to increasing the size of portion 163A, the packet transfer optimizer 132A may re-assign one or more queues to be enabled for direct access of the processing unit 160 instead of being enabled for main memory access. Alternatively, when the rate of receipt of packets is lower than the rate of processing of these packets, the size of the portion 163A can be decreased or kept unchanged. In some embodiments, one or more queue can be updated from being enabled for direct access to being enabled for main memory access. The portion of the cache that is dedicated to receiving traffic directly from the NI 110 is dynamically adjusted according to the volume of traffic ensuring that direct cache access remains efficient in the system 100.

The operations in the flow diagrams of FIG. 2A-D will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2A:
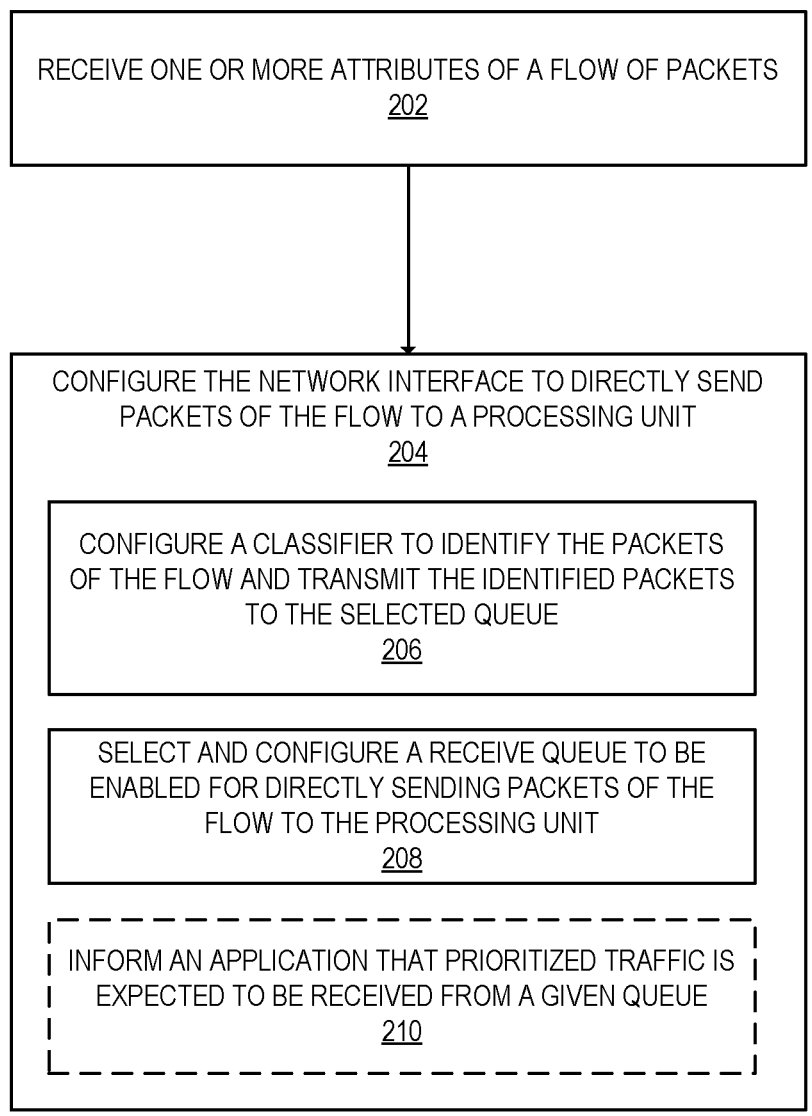
FIG. 2A illustrates a flow diagram of exemplary operations that can be performed for configuring a network device for selectively transferring data to a processing unit through direct access, in accordance with some embodiments.

FIG. 2A illustrates a flow diagram of exemplary operations that can be performed for configuring a network device for selectively transferring data to a processing unit through direct access, in accordance with some embodiments. At operation 202, the NI 110 receives one or more attributes of a flow of packets. The attributes allow the identification of one or multiple flows of packets. The attributes define one or more flows and are used in the NI 110 to distinguish specific packets among all packets received at the NI. The attributes can be received when an application is deployed/scheduled on the system 100. Alternatively or additionally, the attributes can be received during run time, after the application has been deployed. One or more flows can be identified for direct access, and one or more attributes that define the identified flow(s) are transmitted to the NI 110. In some embodiments, identifying these flows results from the prioritization of these flows over other flows by an administrator of the network, an application (e.g., an application running on the network device 102A or another application), a user, or the NI 110. The attributes can include one or a combination of a user identifier, a user selector, a bearer selector, an application identifier, a protocol identifier, a source Internet Protocol (IP) address, a destination IP address, a source port number, and a destination port number. While the embodiments herein describe exemplary attributes that can be used for defining one or more flows of packet, other types of attributes can be used without departing from the scope of the embodiments herein.

In a non-limiting example, the packet transfer optimizer 132A receives one or more attributes that define the first flow of packets 155A and an indication that the first flow of packets 155A is to be directly sent from the NI to the processing unit 160. In some embodiments, the indication is a priority level associated with the attributes. For example, the priority level can be a high priority that indicates that the flows identified with the attributes are to be prioritized over all other flows. The packet transfer optimizer 132A also receives second attributes that identify the second flow 155B. The packet transfer optimizer 132A can receive an indication that the second flow 155B is to be sent to the processing unit 160 through the main memory 166. For example, the indication can be a priority level associated with the second attributes. For example, the priority level can be a low priority that indicates that the flows identified with the second attributes have a lesser priority than the high priority flows.

At operation 204, the packet transfer optimizer configures the network interface to directly send the packets of a flow to the processing unit 160. The packet transfer optimizer 132A configures the classifier 134 (operation 206) and the queues 150 (operation 208). The configuration of the classifier 134 includes configuring the classifier to transfer one or more flows identified with the attributes to one or more queue that are assigned for those flows. The packet transfer optimizer 132A is also operative to configure a subset of the RX queues for sending data directly to the processing unit (i.e., to the cache 162 while avoiding going through the main memory), and another subset of the RX queue(s) for transfer of data to the processing unit through the main memory. The packet transfer optimizer 132A is also optionally operative to configure a subset of the TX queues for receipt of data directly from the processing unit (i.e., from the cache while avoiding going through the main memory), and another subset of the TX queue for receipt of data from the processing unit through the main memory.

The packet transfer optimizer 132A updates a data structure, e.g., a table, that stores the queue assignments (i.e., the set of queues that have direct cache access enabled, and another set of queues that have main memory access-enabled (DMA-access)) and statistics regarding each queue (e.g., arrival rate and departure/processing rate for any given flow class). The statistic can be fetched from available agents/performance counters (not illustrated) in the NI 110. The queue assignment 138 can be included as an extension to the flow table stored at the NI 110 or as a separate table.

The flow of operations moves to operation 206. At operation 206, the packet transfer optimizer 132A selects and configures one or more queues from the receive queues 150 for directly sending traffic to the processing unit 160. A subset of queues, including the first queue Q1, is configured to send data directly to the processing unit 160. Another subset of queues, including RX queue QN, is configured to transmit data to the processing unit by storing the data in the main memory 166.

Following the previous example with the first flow 155A, the packet transfer optimizer 132A configures the classifier to identify and forward the packets of the first flow 155A to the receive queue Q1 and configures Q1 to directly send traffic to the processing unit 160. The packet transfer optimizer 132A configures the classifier to identify and forward the packets of the second flow 155B to another receive queue, e.g., QN that is different from RX queue Q1 and configures QN to send traffic to the processing unit 160 through the main memory 166.

In some embodiments, the packet transfer optimizer 132A is further operative to inform, at operation 210, the application that prioritized traffic is expected to be received from RX queue Q1. If additional RX queues are configured to directly send data to the processing unit, the packet transfer optimizer 132A informs the application of these additional RX queues. In some embodiments, informing the application is an optional operation and can be skipped. In some embodiments, the packet transfer optimizer 132A can optionally be operative to decide and configure an application to employ interrupts or polling to fetch a packet from a given queue.

Figure 2B:
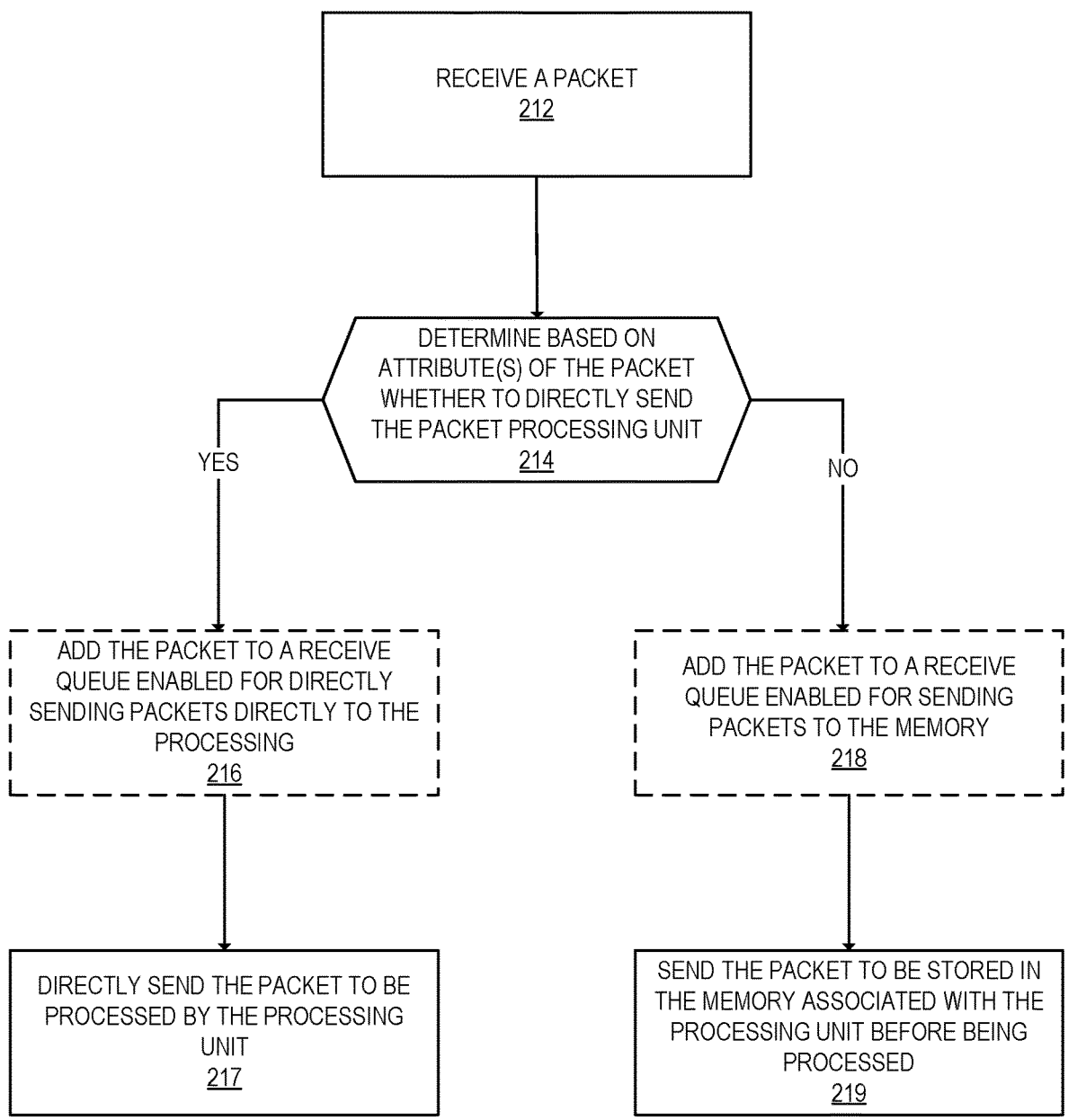
FIG. 2B illustrates a flow diagram of exemplary operations that can be performed for selectively transferring data to a processing unit through direct access, in accordance with some embodiments.

FIG. 2B illustrates a flow diagram of exemplary operations that can be performed for selectively transferring data to a processing unit through direct access, in accordance with some embodiments.

At operation 212, the NI receives a first packet. At operation 214, the NI 110 determines based on one or more first attributes of the packet that the packet is to be directly sent to the processing unit. In some embodiments, in response to determining that the first packet is to be directly sent to the processing unit, the NI 110 adds, at operation 216 the first packet to a first receive queue that is enabled for directly sending packets to the processing unit. At operation 217, in response to determining that the first packet is to be directly sent to the processing unit, the NI 110 directly sends the first packet to the processing unit for processing. Directly sending the first packet to the processing unit for processing includes sending the first packet to the cache 162 or register 165 without storing the packet to the main memory 166.

At operation 212, a second packet is received. At operation 214, the packet transfer optimizer determines based on second attributes of the second packet that the second is not to be directly sent to the processing unit. In response to determining that the second packet is not to be directly sent to the processing unit, the NI 110 adds, at operation 218, the second packet to a second receive queue that is enabled for sending packets to the main memory associated with the processing unit. Responsive to determining that the second packet is not to be directly sent to the processing unit, the NI 110 sends, at operation 219, the second packet to be stored in a main memory associated with the processing unit before being processed by the processing unit. The second packet is later retrieved from the main memory and made available in the cache 162 of the processing unit or made available directly in register(s) 165 of the processing unit 160 for processing by the processing unit.

Figure 2C:
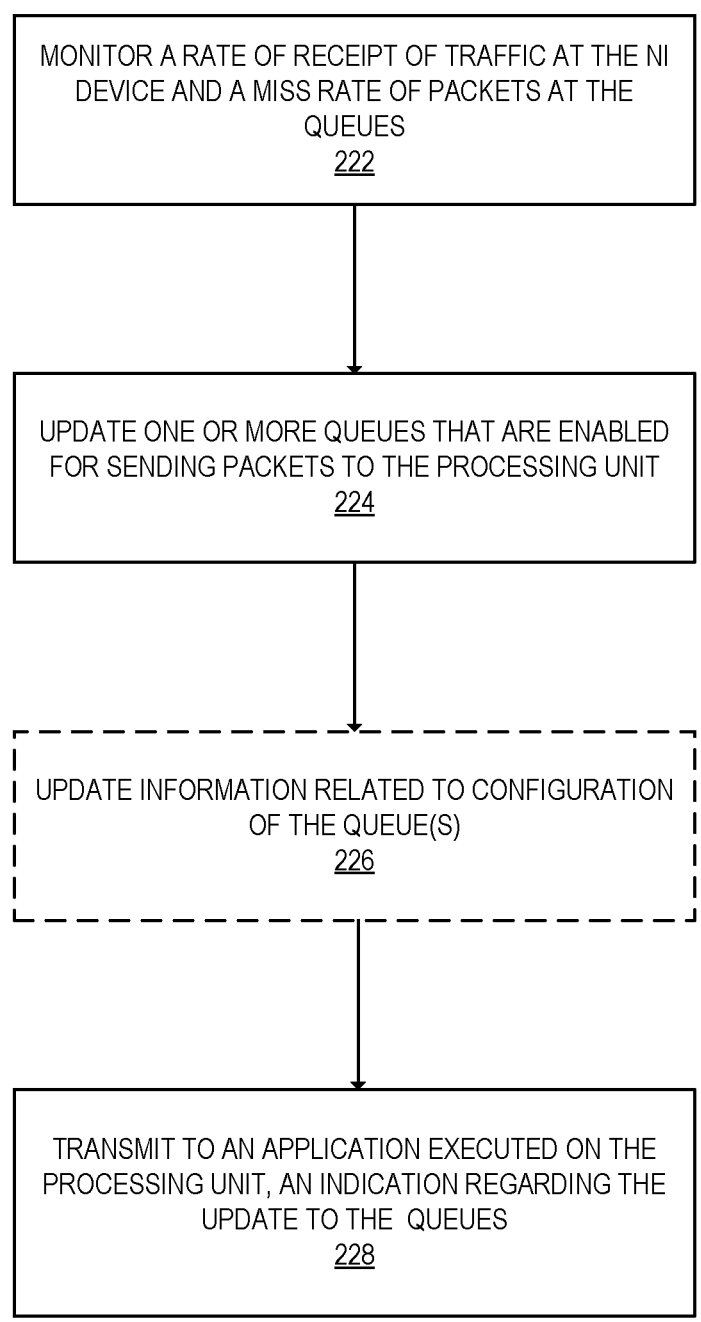
FIG. 2C illustrates a flow diagram of exemplary operations that can be performed for dynamically updating one or more queues of the NI, in accordance with some embodiments.

FIG. 2C illustrates a flow diagram of exemplary operations that can be performed for dynamically updating one or more queues of the NI, in accordance with some embodiments. At operation 222, the NI 110 monitors a rate of receipt of traffic at the NI 110 and a miss rate of packets. The miss rate of packets is a miss rate at the queues 150.

At operation 224, the NI 110 updates one or more queues that are enabled for directly sending packets to the processing unit. In some embodiments, the number of queues that are enabled for directly sending packets to the processing is increased. In other embodiments, the number of queues that are enabled for directly sending packets to the processing unit is decreased. The flow of operations moves to operation 226. At operation 226, the NI 110 updates information related to configuration of the queues. The information includes assignment of the queues to direct access or main memory access. For example, the NI 110 may include a table in which the assignment of Q1 to direct cache access of the processing unit is defined and the assignment of QN to a memory type access of the processing unit 160 is defined. When one or more queues are updated to be enabled for direct cache access, the assignment of these queues is updated in the table. Alternatively or additionally, when one or more queues are updated to be enabled for memory type access, the assignment of these queues is updated in the table. The flow moves to operation 228. At operation 228, the NI 110 transmits to an application running on the processing unit, an indication regarding the updated assignments of the queues.

Figure 2D:
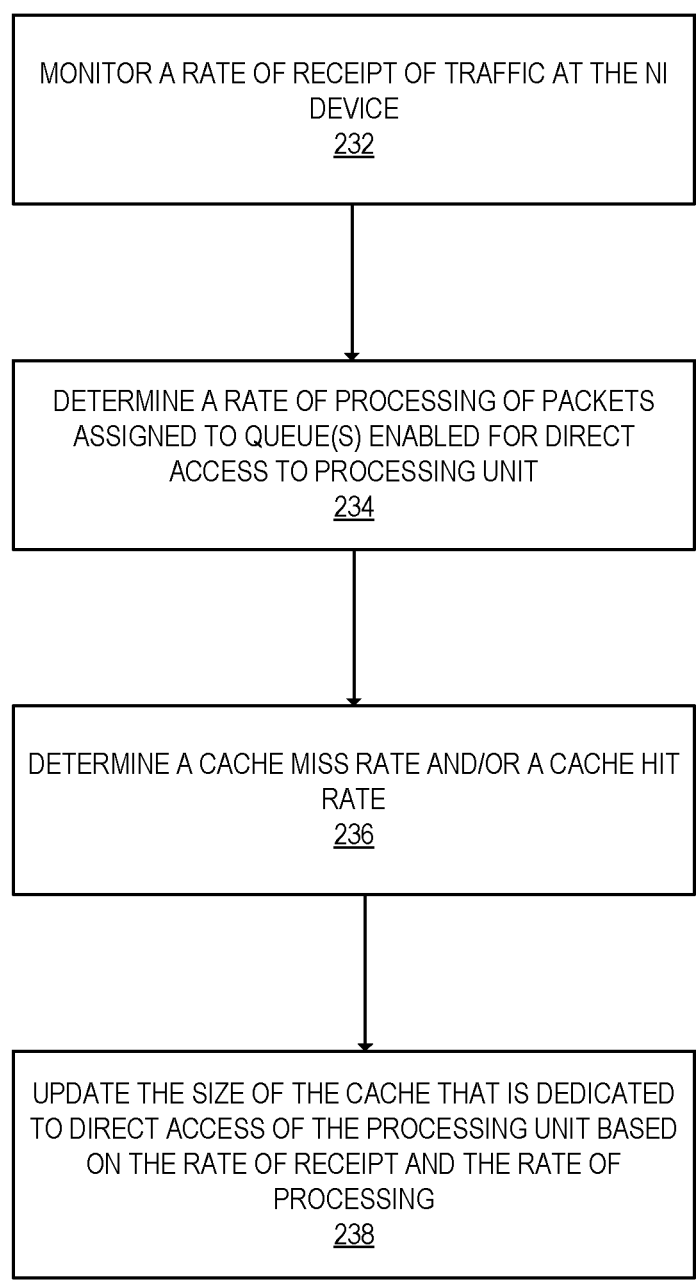
FIG. 2D illustrates a flow diagram of exemplary operations that can be performed for dynamically updating a portion of the cache that is enabled for direct access to the processing unit, in accordance with some embodiments.

FIG. 2D illustrates a flow diagram of exemplary operations that can be performed for dynamically updating a portion of the cache that is enabled for direct access to the processing unit and/or bandwidth of on-chip or off-chip storage, in accordance with some embodiments.

At operation 232, the packet transfer optimizer 132A determines a rate of receipt of the traffic that is configured to be directly transferred to the processing unit 160. The rate of receipt of this traffic can be determined based on performance counters at the NI 110. The packet transfer optimizer 132A further determines, at operation 234, a processing rate of the packets that are assigned to queue(s) enabled for direct access to the processing unit 160. The processing rate of packets can be accessible through performance counters of the NI 110. Additionally or alternatively, the processing rate can be received from or determined based on feedback received from the processing unit 160. The packet transfer optimizer 132A may further determine, at operation 236, a cache miss rate and/or a cache hit rate. The cache miss/hit rate can be obtained from system's I/O controller, memory controller, and/or performance counters available in the processing unit. A cache miss rate corresponds to the fraction or percentage of accesses in the cache 163 that result in a miss.

The flow of operations moves to operation 238. At operation 238, the packet transfer optimizer 132A updates a size of the cache 162 that is dedicated to direct access of the processing unit (e.g., portion 163A) and/or bandwidth of on-chip or off-chip storage based on the rate of receipt of the packets and based on the rate of processing these packets. Additionally or alternatively, the size of the cache 162 that is dedicated to direct access of the processing unit and/or bandwidth of on-chip or off-chip storage are adapted according to system performance metrics such as misses at NI or misses at cache. In some embodiments, the portion 163A and/or bandwidth of on-chip or off-chip storage is further updated based on the miss/hit rate. In one exemplary embodiment, the receipt rate and the processing rate are compared. When the rate of receipt is higher than the processing rate, i.e., packets are received faster than they are processed by the processing unit, the packet transfer optimizer 132A increases the capacity of the portion 163A. In addition to increasing the size of portion 163A, the packet transfer optimizer 132A may re-assign one or more queues to be enabled for direct access of the processing unit 160 instead of being enabled for main memory access. Alternatively, when the rate of receipt of packets is lower than the rate of processing of these packets, the size of the portion 163A can be decreased or kept unchanged. In some embodiments, one or more queue can be updated from being enabled for direct access to being enabled for main memory access. The portion of the cache that is dedicated to receiving traffic directly from the NI 110 and/or bandwidth of on-chip or off-chip storage are dynamically adjusted according to the volume of traffic ensuring that direct cache access remains efficient in the system 100.

Split of Packets for Access to Processing Unit

Many applications running on a network device need only a portion of a packet (e.g., the packet header) to process the packet. However, in current implementations, e.g., when a network element is virtualized and runs as an application on commodity servers, the entire packet is directly sent to the processing unit or is stored in the main memory of the processing unit. These implementations can overwhelm resources such as communication buses and has an impact on memory bandwidth consumption. In addition, when direct cache access is enabled, the portion of the cache that is used for direct cache access is limited. Transferring the portion of a packet that is not needed (e.g., a payload of a packet) by the application can result in hiding the benefits of direct cache access or making the portion of the cache reserved for the direct cache access a bottleneck for accessing by the processing unit. This is particularly prevalent, when the packet arrival rate at a network device is faster than the packet processing rate. The embodiments described herein provide solutions for efficient transfer of data between a receiving electronic device (i.e., NI, a switch, etc.) and a processing unit that is operative to execute code for implementing a NE. As will be described in further detail below, the embodiments herein enable an electronic device to selectively provide a first portion of a packet, e.g., the packet's header, to the processing unit while storing the remaining portion of the packet without transferring it to the processing unit.

The embodiments presented herein reduce the contention on the resources used for transferring data to the processing unit (e.g., through direct access) and improve the performance of packet processing and I/O handling.

The embodiments herein present a method and a system for enabling selecting transfer of portions of packets to the processing unit. An electronic device receives one or more packet(s). The electronic device determines based on attributes of the packet(s) that the packet(s) are to be split. In response to determining that the packet is to be split, the electronics device splits the packet(s) into first portion(s) and second portion(s). A first portion of a packet is to be processed by the processing unit and the second portion of the packet is to be stored without being processed by the processing unit. The electronic device sends the first portion of the packet toward the processing unit for processing; and stores the second portion of the packet. The electronic device receives an indication resulting from processing the first portion of the packet in the processing unit. The electronic device determines that the indication includes a processed first portion of the packet resulting from the processing of the first portion by the processing unit. In response to determining that the indication includes a processed first portion of the packet, the electronic device merges the processed first portion of the packet with the second portion of the packet to obtain a processed packet; and outputs the processed packet.

Figure 1C:
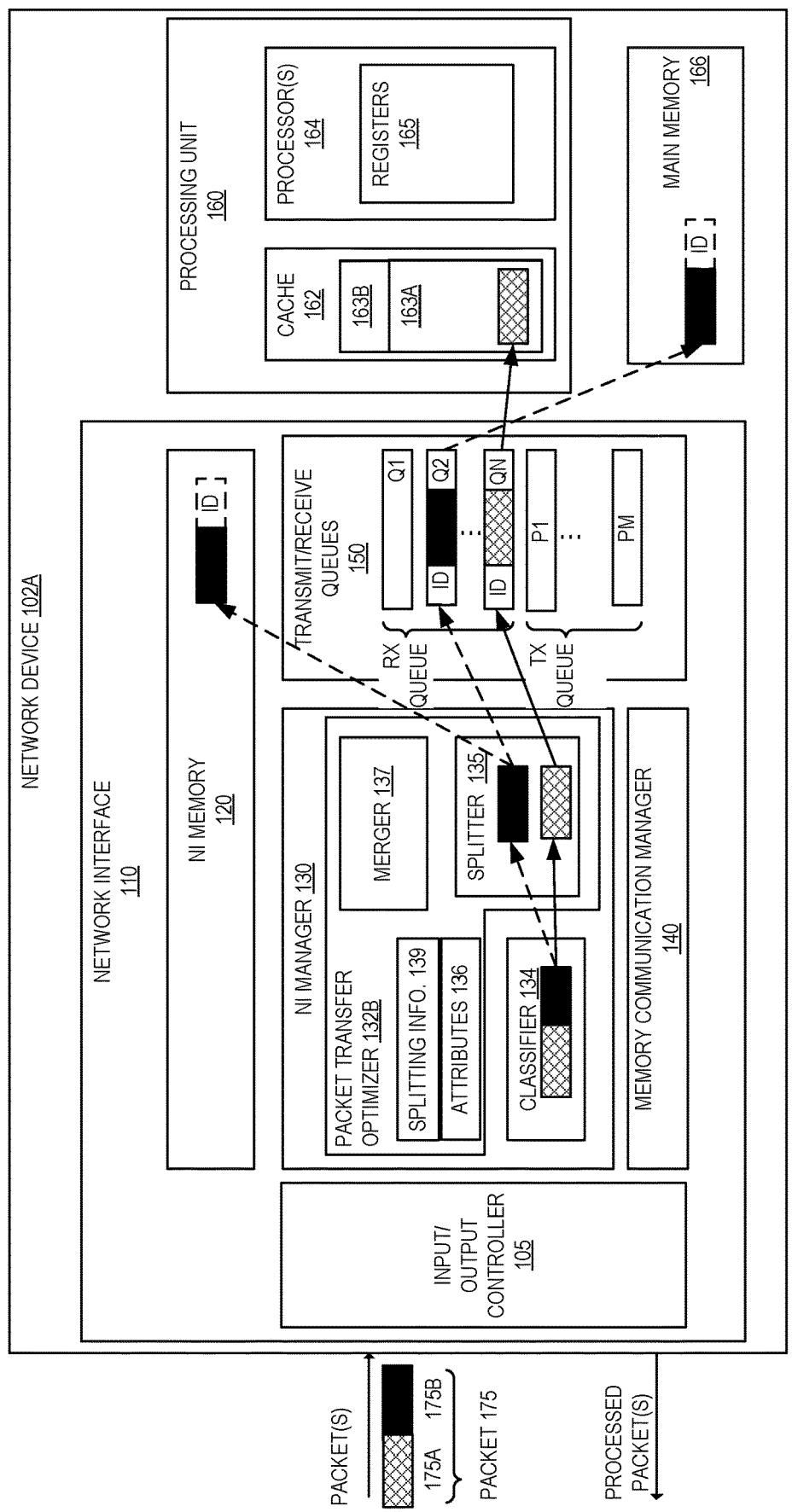
FIG. 1C illustrates a block diagram of an exemplary system for enabling the selective transfer of portions of packets to the processing unit, in accordance with some embodiments.

FIG. 1C illustrates a block diagram of an exemplary system for enabling the selective transfer of portions of packets to the processing unit, in accordance with some embodiments. The operations for selective transfer of portions of the packets will be described with the packet transfer optimizer 132B of the NI. In these embodiments, the electronic device is the NI 110. While the embodiments will be described with respect to the NI 110, in other embodiments, the packet transfer optimizer 132B can be included in another ND, e.g., ND 102B as illustrated in FIG. 1A. In these embodiments, a packet is split into a first portion and a second portion. The first portion is sent towards the processing unit 160 to be processed, while the second portion is stored in the ND 102B. The first portion is received at the NI 110 of the ND 102A and transferred to the processing unit 160 through direct access or memory access.

The NI 110 includes a packet transfer optimizer 132B. The packet transfer optimizer 132B receives configuration information. In some embodiments, the configuration information can be received as part of an initialization phase of the electronic device. The configuration information can include attributes that identify a flow of packets. The attributes allow to distinguish packets of traffic received at the NI 110 from other packets of traffic. These attributes can be used to generate a set of rules for a programmable classifier of the electronic device to distinguish flow(s) from other flows. Additionally or alternatively, the rules can be generated by observing/analyzing the flows received at the electronic device. For example, the electronic device can automatically identify a flow after detecting that the flow is a heavy hitter. Thus, the packet transfer optimizer 132B may receive the attributes or automatically determine the attributes through an analysis of the received traffic. The attributes can include one or a combination of a user identifier, a user selector, a bearer selector, an application identifier, a protocol identifier, a source Internet Protocol (IP) address, a destination IP address, a source port number, and a destination port number. While the embodiments herein describe exemplary attributes that can be used for defining one or more flows of packet, other types of attributes can be used without departing from the scope of the embodiments herein.

The configuration information further includes information regarding which portion of the packets of the flow is to be transferred to the processing unit 160. The packet transfer optimizer 132B includes the attributes 136, the splitter 135, the merger 137, and a data structure 139 for storing the splitting information for the packets. The configuration information is used to configure, the classifier 134, the merger 137, the splitter 135, the attributes 136. The classifier 134 is operative to identify packets that are to be split. When it is determined that the packet is not to be split, the electronic device sends the packet toward the processing unit 160. When the electronic device is an NI 110, the packet is sent to a RX queue. In some embodiments, the RX queue is enabled to directly send the packet to the processing unit 160 (e.g., directly store in cache 162 or in registers 165 of the processing unit 160). In other embodiments, the RX queue is enabled to send the packet to the processing unit 160 by storing the packet in the main memory 166. When the electronic device is a network device, e.g., ND 102B, that is coupled with another network device including the processing unit 160, the packet is output from the ND 102B and sent to the processing unit 160A through the NI 110. In these embodiments, the packet is received at the ND 102A and transferred to the processing unit 160. Several mechanisms can be used for transferring the packet to the processing unit 160 (e.g., direct access (cache or registers), memory access, etc.). In some embodiments, the transfer of the packet to the processing unit when received at the ND 102A can be performed as described with reference to FIGS. 1B, 2A-D.

Alternatively, when a packet is identified as a packet to be split, the packet is sent to the splitter 135. The splitter 135 receives the packet and generates an identifier for the packet. The identifier uniquely identify the packet and distinguishes it from other packets. The splitter 135 splits the packet into a first portion and a second portion. The first portion is to be processed by the processing unit and the second portion is to be stored without being processed by the processing unit. In some embodiments, the splitter adds the identifier to the first portion. For example, the identifier can be added to unused/reserved bits of the header of the packet when a header is part of the first portion. Alternatively, the packet identifier can be attached to the head or tail of the first portion. Optionally, the splitter adds the identifier to the second portion of the packet. For example, the identifier can be added to unused/reserved bits of the header of the packet when a header is part of the second portion. Alternatively, the packet identifier can be attached to the head or tail of the second portion.

The splitter 135 is operative to store information related to the splitting of the packet in the data structure 139. The splitting information includes: the packet identifier, the position of the second portion, a location of the second portion (e.g., a pointer to the physical location of the second portion in memory (e.g., in main memory 166, or in NI memory 120), and a size of the second portion that was not sent to the processing unit 160. In some embodiments, if the first portion includes non-contiguous parts of the packet, the splitting information may include additional parameters describing how the packet is divided and which parts form the first portion.

The electronic device sends the first portion of the packet toward the processing unit for processing. When the electronic device is an NI 110, the first portion of the packet is sent to a RX queue. In some embodiments, the RX queue is enabled to directly send the first portion of the packet to the processing unit 160 (e.g., directly store in cache 162 or in registers 165 of the processing unit 160). In other embodiments, the RX queue is enabled to send the first portion of the packet to the processing unit 160 by storing the first portion of the packet in the main memory 166. When the electronic device is a network device, e.g., ND 102B, that is coupled with another network device 102A including the processing unit 160, the first portion of the packet is output from the ND 102B and sent to the processing unit 160A through the NI 110. In these embodiments, the first portion of the packet is received at the ND 102A and transferred to the processing unit 160. Several mechanisms can be used for transferring the first portion of the packet to the processing unit 160 (e.g., direct access (cache or registers), memory access, etc.). In some embodiments, the transfer of the first portion of the packet to the processing unit when received at the ND 102A can be performed as described with reference to FIGS. 1B, 2A-D.

The electronic device stores the second portion of the packet. The second portion of the packet can be stored in the main memory 166 of the processing unit 160, in the NI memory 120, or in a memory of the ND 102B. The electronic device can determine where to store the second portion based on the configuration parameters received for the flow of packets. In some embodiments, when the first portion is sent directly to the processing unit 160, the second portion of the packet is stored in the main memory 166 associated with the processing unit 160. In another example, when sending the first portion to the processing unit for processing includes storing the first portion to the main memory 166 associated with the processing unit 160, storing the second portion includes storing the second portion in a buffer of the electronic device. For example, the second portion can be stored in a memory of the ND 102B or in NI memory 120 of the NI 110 in ND 102A.

The first portion of the packet is processed at the processing unit 160 and is sent back to be merged with the second portion when the processing is completed. The electronic device receives an indication resulting from processing the first portion of the packet in the processing unit. The indication may include the processed first portion of the packet. In some embodiments, the processed first portion is stored in the TX queues of the NI 110. In some embodiments, the processed first portion is received at the ND 102B from the ND 102A.

The electronic device determines whether the indication indicates that the first packet is to be dropped. When the packet is to be dropped, the second portion of the packet is removed from storage. When it is determined that the packet is not dropped, the electronic device may optionally determine if a timer has timed out. If the timer has timed out before receipt of a processed first portion, the second portion is removed from storage.

If the timer has not timed out before receipt of a processed first portion, the electronic device determines whether the indication includes a processed first portion of the packet resulting from the processing of the first portion by the processing unit. In response to determining that the indication does not includes a processed first portion of the packet, the electronic device has received a processed entire packet and the processed packet is output. In some embodiments, outputting the processed packet includes sending the processed packet to another network device, e.g., from ND 102A to ND 102B.

Alternatively, when the electronic device determines that the indication includes a processed first portion of the packet, the merger 13 determines the splitting information for the processed first portion of the packet. In some embodiments, determining the splitting information includes determining the identifier of the packet, e.g., which can be included in the processed first portion of the packet, and retrieving the splitting information for the packet from the data structure 139 based on the identifier of the packet. In one embodiment, the retrieved information includes the position of the second portion in the packet, a location of the second portion (e.g., a pointer to the physical location of the second portion in memory (e.g., in main memory 166, or in NI memory 120), and a size of the second portion that was not sent to the processing unit 160. Based on the splitting information, the merger 137 merges the processed first portion of the packet with the second portion of the packet to obtain a processed packet. Merging the processed first portion of the packet with the second portion includes retrieving the second portion from storage based on the splitting information. For example, the second portion can be retrieved from the main memory 166, or the NI memory 120 based on the address of the second portion included in the splitting information. In addition, based on the size of the second portion and the position of the second portion in the packet, the merger 137 can merge the processed first portion and the second portion. In some embodiments, instead of storing only the second portion of the packet, the electronic device may store the entire packet. In these embodiments, merging the processed first portion and the second portion includes retrieving the entire packet and adding the processed first portion to the packet to obtain the processed packet. Once the portions are merged, the processed packet is output. In some embodiments, merging the first portion of the packet and the second portion of the packet can further include performing operation(s)/modification(s) on the packet. For example, the merging may (re)calculate, updated, and attach to the processed packet one or more flag(s) or trailer(s) (e.g., Cyclic Redundancy Check (CRC) Error) that depend on the entire packet.

The operations in the flow diagrams of FIG. 3A-C will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3A:
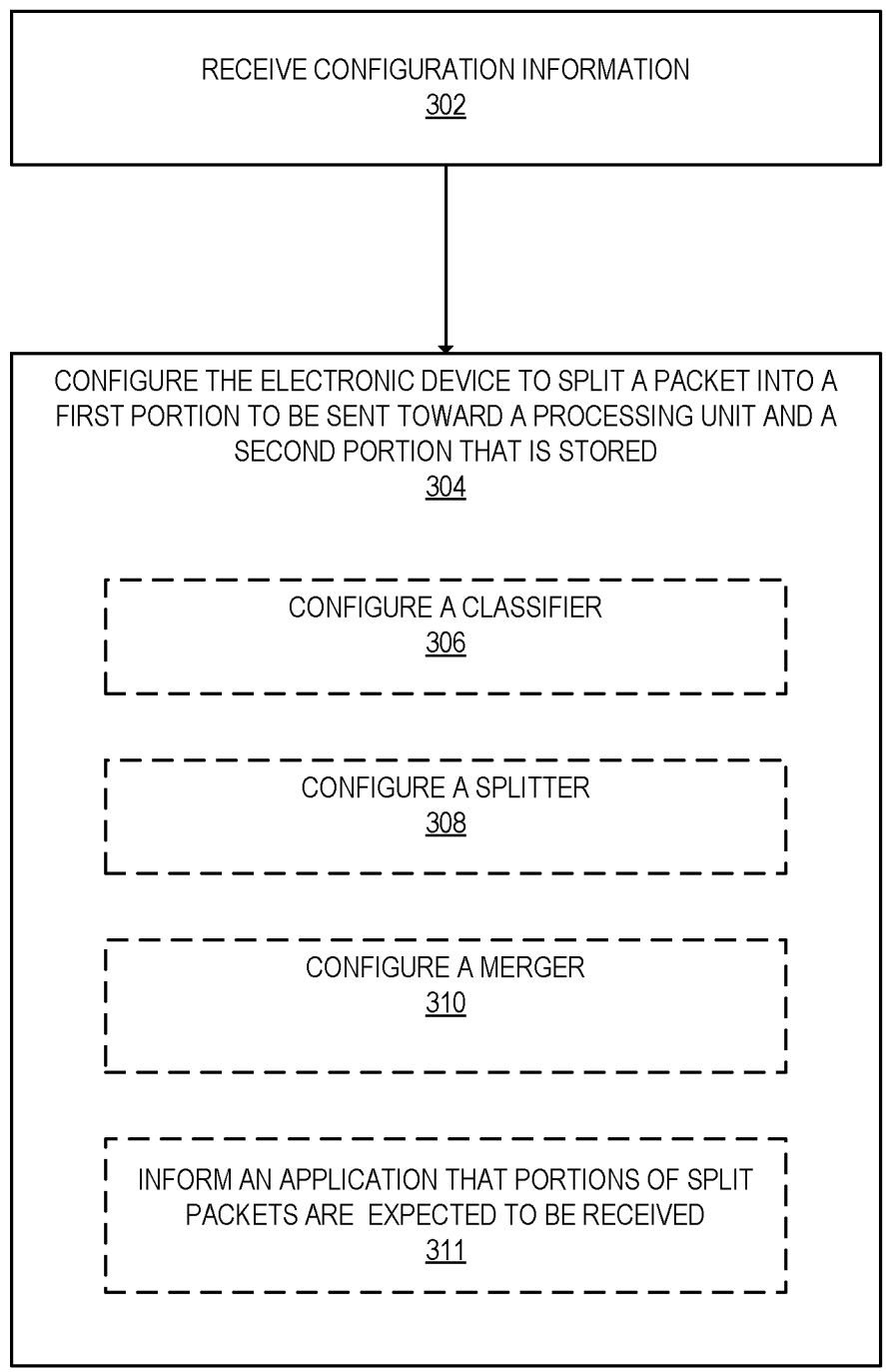
FIG. 3A illustrates a flow diagram of exemplary operations for configuring an electronic device for selective transfer of portions of packets to the processing unit, in accordance with some embodiments.

FIG. 3A illustrates a flow diagram of exemplary operations for configuring an electronic device for selective transfer of portions of packets to the processing unit, in accordance with some embodiments.

At operation 302, the packet transfer optimizer 132B receives configuration information. In some embodiments, the configuration information can be received as part of an initialization phase of the electronic device. The configuration information can include attributes that identify a flow of packets. The attributes allow to distinguish packets of traffic received at the electronic device from other packets of traffic. These attributes can be used to generate a set of rules for a programmable classifier of the electronic device to distinguish flow(s) from other flows. Additionally or alternatively, the rules can be generated by observing/analyzing the flows received at the electronic device. For example, the electronic device can automatically identify a flow after detecting that the flow is a heavy hitter. Thus, the packet transfer optimizer 132B may receive the attributes or automatically determine the attributes through an analysis of the received traffic. The attributes can include one or a combination of a user identifier, a user selector, a bearer selector, an application identifier, a protocol identifier, a source Internet Protocol (IP) address, a destination IP address, a source port number, and a destination port number. While the embodiments herein describe exemplary attributes that can be used for defining one or more flows of packet, other types of attributes can be used without departing from the scope of the embodiments herein.

The packet transfer optimizer 132B receives information regarding which portion of the packets of the flow is to be transferred to the processing unit 160. In some embodiments, the portion of a packet that is to be transferred is a header of the packet. In other embodiments, the portion of the packet that is to be transfer can include a header and a part of the payload of the packet. For example, when the packet is an encapsulated packet including more than one header, the selected portion can include a higher-level protocol header and a lower-level protocol header. In other examples, the portion of the payload that is selected to be sent to the processing unit is not a header and can be needed for processing by the processing unit 160. In some embodiments, the first portion of the packet is to include contiguous parts of the packet. In other embodiments, the first portion of the packet is to include non-contiguous parts of the packet.

At operation 304, the electronic device is configured to split the packet into a first portion to be sent toward the processing unit 160 and a second portion that is stored. In some embodiments, configuring the electronic device includes operation 306, operation 308, operation 310, and optional operation 311.

At operation 306, the packet transfer optimizer 132B configures a classifier of the electronic device. The classifier 134 is configured to identify the packets based on the attributes and determine whether the packets are to be split or not. At operation 308, the packet transfer optimizer 132B configures a splitter. The splitter 135 is configured to split a packet received from the classifier into the first and the second portion. The first portion is to be transmitted to the processing unit 160 and the second portion is to be stored. At operation 310, the packet transfer optimizer 132B configures a merger 137. The merger 137 is configured to merge processed portions of packets with stored portions of packets into a processed packet to be output from the electronic device.

In some embodiments, the packet transfer optimizer 132B is further operative to inform, at operation 311, the application that portions of split packets are expected to be received. For example, when the packet transfer optimizer 132B is included in an NI, the packet transfer optimizer 132B can inform the application that portions of split packets are expected to be received from RX queue QN. In some embodiments, informing the application is an optional operation and can be skipped.

Figure 3B:
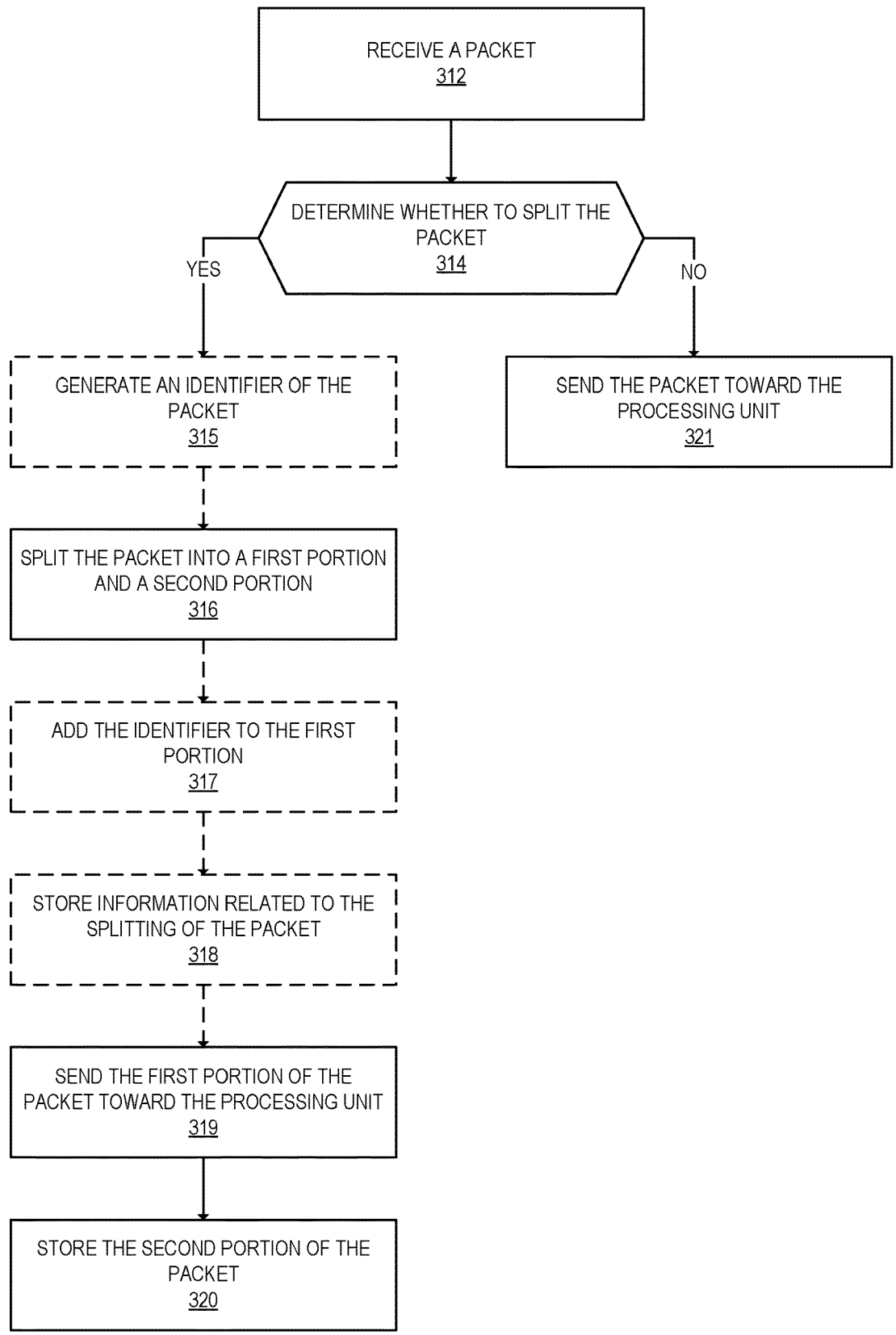
FIG. 3B illustrates a flow diagram of exemplary operations for selective transfer of portions of packets to the processing unit, in accordance with some embodiments.

FIG. 3B illustrates a flow diagram of exemplary operations for selective transfer of portions of packets to the processing unit, in accordance with some embodiments. At operation 312, a packet is received. The packet includes several portions. For example, a packet includes at least a first portion that includes a header and a second portion that includes a payload. In another example, the packet includes a first portion that includes a header and parts of the payload and a second portion that includes the remaining part of the payload. For example, the ND 102A receives the packet 175, that includes a first portion 175A and a second portion 175B.

At operation 314, the electronic device determines based on one or more attributes of the packet that the packet is to be split. The attributes can include one or a combination of a user identifier, a user selector, a bearer selector, an application identifier, a protocol identifier, a source Internet Protocol (IP) address, a destination IP address, a source port number, and a destination port number. In response to determining that the packet is not to be split, the electronic device sends, at operation 321, the packet toward the processing unit 160. When the electronic device is an NI 110, the packet is sent to a RX queue. In some embodiments, the RX queue is enabled to directly send the packet to the processing unit 160 (e.g., directly store in cache 162 or in registers 165 of the processing unit 160). In other embodiments, the RX queue is enabled to send the packet to the processing unit 160 by storing the packet in the main memory 166. When the electronic device is a network device, e.g., ND 102B, that is coupled with another network device including the processing unit 160, the packet is output from the ND 102B and sent to the processing unit 160A through the NI 110. In these embodiments, the packet is received at the ND 102A and transferred to the processing unit 160. Several mechanisms can be used for transferring the packet to the processing unit 160 (e.g., direct access (cache or registers), memory access, etc.). In some embodiments, the transfer of the packet to the processing unit when received at the ND 102A can be performed as described with reference to FIGS. 1B, 2A-D.

In response to determining that the packet is to be split, the flow of operations moves to option operations 315, 317 and 318, and operations 316, 319, and 320. At operation 315, the electronic device generates an identifier of the packet. The identifier uniquely identifies the packet and distinguishes it from other packets. In one example, the identifier can be calculated by hashing the packet or a portion of the packet (e.g., the first and/or the second portion). Other mechanisms can be used for calculating the identifier of the packet.

At operation 316, the electronic device splits the packet into a first portion and a second portion. The first portion is to be processed by the processing unit and the second portion is to be stored without being processed by the processing unit. The first portion can include contiguous parts of the packet. The first portion can include non-contiguous parts of the packet. At operation 317, the identifier is added to the first portion. For example, the identifier can be added to unused/reserved bits of the header of the packet when a header is part of the first portion. Alternatively, the packet identifier can be attached to the head or tail of the first portion. Optionally the identifier is added to the second portion of the packet. For example, the identifier can be added to unused/reserved bits of the header of the packet when a header is part of the second portion. Alternatively, the packet identifier can be attached to the head or tail of the second portion.

At operation 318, the electronic device stores information related to the splitting of the packet. The splitting information is stored in a data structure in the electronic device, e.g., a table in NI 110. The splitting information includes: the packet identifier, the position of the second portion in the packet, a location of the second portion (e.g., a pointer to the physical location of the second portion in memory (e.g., in main memory 166, or in NI memory 120), and a size of the second portion that was not sent to the processing unit 160. In some embodiments, if the first portion includes non-contiguous parts of the packet, the splitting information may include additional parameters describing how the packet is divided and which parts form the first portion.

At operation 319, the electronic device sends the first portion of the packet toward the processing unit for processing. When the electronic device is an NI 110, the first portion of the packet is sent to a RX queue. In some embodiments, the RX queue is enabled to directly send the first portion of the packet to the processing unit 160 (e.g., directly store in cache 162 or in registers 165 of the processing unit 160). In other embodiments, the RX queue is enabled to send the first portion of the packet to the processing unit 160 by storing the first portion of the packet in the main memory 166. When the electronic device is a network device, e.g., ND 102B, that is coupled with another network device 102A including the processing unit 160, the first portion of the packet is output from the ND 102B and sent to the processing unit 160A through the NI 110. In these embodiments, the first portion of the packet is received at the ND 102A and transferred to the processing unit 160. Several mechanisms can be used for transferring the first portion of the packet to the processing unit 160 (e.g., direct access (cache or registers), memory access, etc.). In some embodiments, the transfer of the first portion of the packet to the processing unit when received at the ND 102A can be performed as described with reference to FIGS. 1B, 2A-D.

The flow moves to operation 320. At operation 320, the electronic device stores the second portion of the packet. The second portion of the packet can be stored in the main memory 166 of the processing unit 160, in the NI memory 120, or in a memory of the ND 102B. The electronic device can determine where to store the second portion based on the configuration parameters received for the flow of packets. In some embodiments, when the first portion is sent directly to the processing unit 160, the second portion of the packet is stored in the main memory 166 associated with the processing unit 160. In another example, when sending the first portion to the processing unit for processing includes storing the first portion to the main memory 166 associated with the processing unit 160, storing the second portion includes storing the second portion in a buffer of the electronic device. For example, the second portion can be stored in a memory of the ND 102B or in NI memory 120 of the NI 110 in ND 102A. In some embodiments, instead of storing only the second portion of the packet, the electronic device may store the entire packet. In these embodiments, the first portion is sent to toward the processing unit and the entire packet is stored.

Figure 3C:
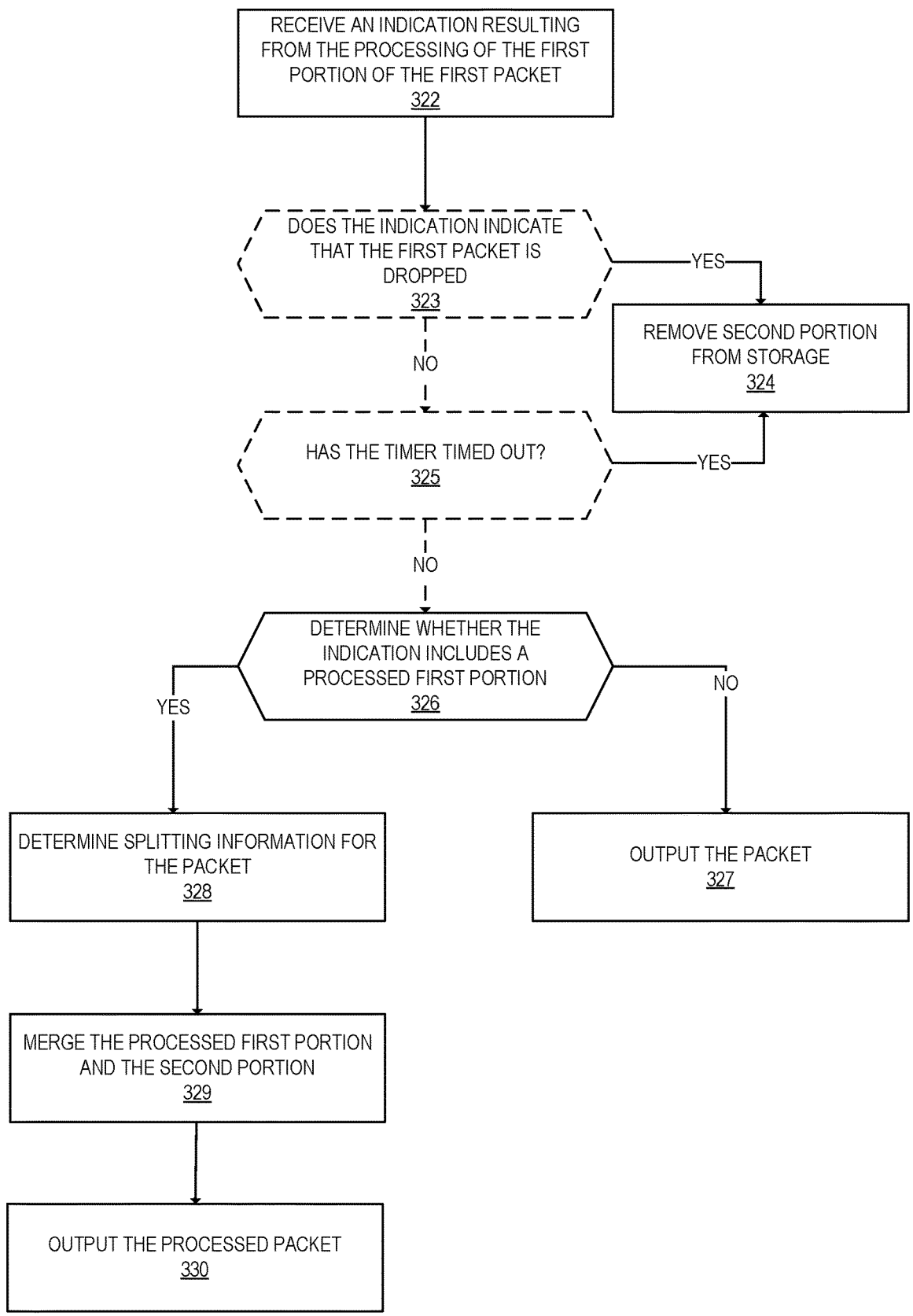
FIG. 3C illustrates a flow diagram of exemplary operations for handling split packets, in accordance with some embodiments.

FIG. 3C illustrates a flow diagram of exemplary operations for handling split packets, in accordance with some embodiments. In some embodiments, the processing unit 160 processes the first portion of the packet and returns a processed first portion. In other embodiments, during the processing of the first portion, the processing unit 160 determines that the packet is to be dropped. In some embodiments, an error may occur during the processing of the first portion and an error message is output from the processing unit 160 to the electronic device, i.e., NI 110 or to ND 102B.

At operation 322, the electronic device receives an indication resulting from processing the first portion of the packet in the processing unit. The indication may include the processed first portion of the packet. The processed first portion of the packet is output by the processing unit 160 after processing the first portion. In some embodiments, the processed first portion is stored in the TX queues of the NI 110. In some embodiments, the processed first portion is output from ND 102A to the ND 102B.

The flow of operation moves to operation 323. At operation 323, the electronic device determines whether the indication indicates that the first packet is to be dropped. When the packet is to be dropped, the flow moves to operation 324. At operation 324, the second portion of the packet is removed from storage. When it is determined that the packet is not dropped, the flow can move to optional operation 325. In some embodiments, when the first portion is sent to the processing unit, a timer is started. At optional operation 325, the electronic device determines if the timer has timed out. If the timer has timed out before receipt of a processed first portion, the flow moves to operation 324. If the timer has not yet timed out, the flow moves to operation 326.

At operation 326, the electronic device determines whether the indication includes a processed first portion of the packet resulting from the processing of the first portion by the processing unit. In response to determining that the indication does not includes a processed first portion of the packet, the flow moves to operation 327. The electronic device has received a processed entire packet and at operation 327 the processed packet is output. In some embodiments, outputting the processed packet includes sending the processed packet to another network device, e.g., from ND 102A to ND 102B.

Alternatively, when the electronic device determines that the indication includes a processed first portion of the packet, the flow moves to operation 328. At operation 328, the electronic device determines the splitting information for the processed first portion of the packet. In some embodiments, determining the splitting information includes determining the identifier of the packet, e.g., which can be included in the processed first portion of the packet, and retrieving the splitting information for the packet from the data structure 139 based on the identifier of the packet. In one embodiment, the retrieved information includes the position of the second portion in the packet, a location of the second portion (e.g., a pointer to the physical location of the second portion in memory (e.g., in main memory 166, or in NI memory 120), and a size of the second portion that was not sent to the processing unit 160. Based on the splitting information, the electronic device merges (at operation 329) the processed first portion of the packet with the second portion of the packet to obtain a processed packet. Merging the processed first portion of the packet with the second portion includes retrieving the second portion from storage based on the splitting information. For example, the second portion can be retrieved from the main memory 166, or the NI memory 120 based on the address of the second portion included in the splitting information. In addition, based on the size of the second portion and the position of the second portion in the packet, the electronic device can merge the processed first portion and the second portion. In some embodiments, instead of storing only the second portion of the packet, the electronic device may store the entire packet. In these embodiments, merging the processed first portion and the second portion includes retrieving the entire packet and adding the processed first portion to the packet to obtain the processed packet. In some embodiments, merging the first portion of the packet and the second portion of the packet can further include performing operation(s)/modification(s) on the packet. For example, the merging may (re)calculate, updated, and attach to the processed packet one or more flag(s) or trailer(s) (e.g., Cyclic Redundancy Check (CRC) Error) that depend on the entire packet. The flow moves to operation 330. At operation 330 the processed packet is output.

The embodiments described herein present an efficient mechanism of processing packets in a network device. A selected portion of a packet is sent to the processing unit for processing instead of the entire packet, consequently improving performance of packet processing and I/O handling in a network device.

Infrastructure:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

Figure 4A:
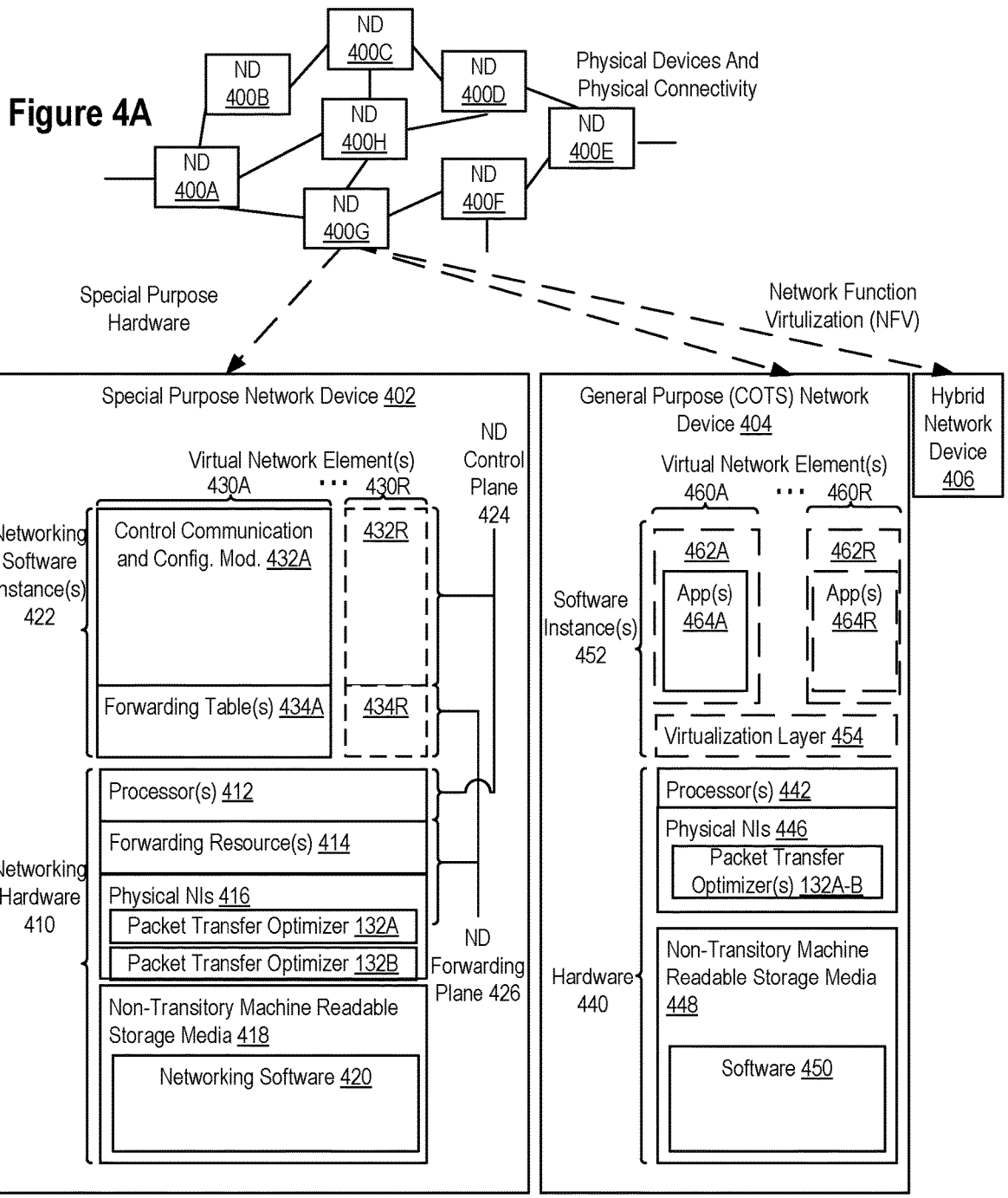
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
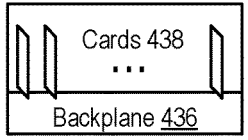
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general-purpose network device 404 includes hardware 440 comprising a set of one or more processor(s) 442 (which are often COTS processors) and physical NIs 446, as well as non-transitory machine-readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 4C:
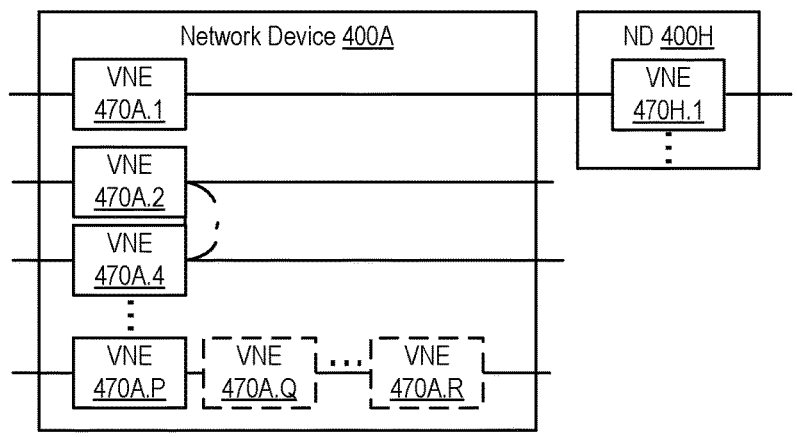
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the processor(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 4D:
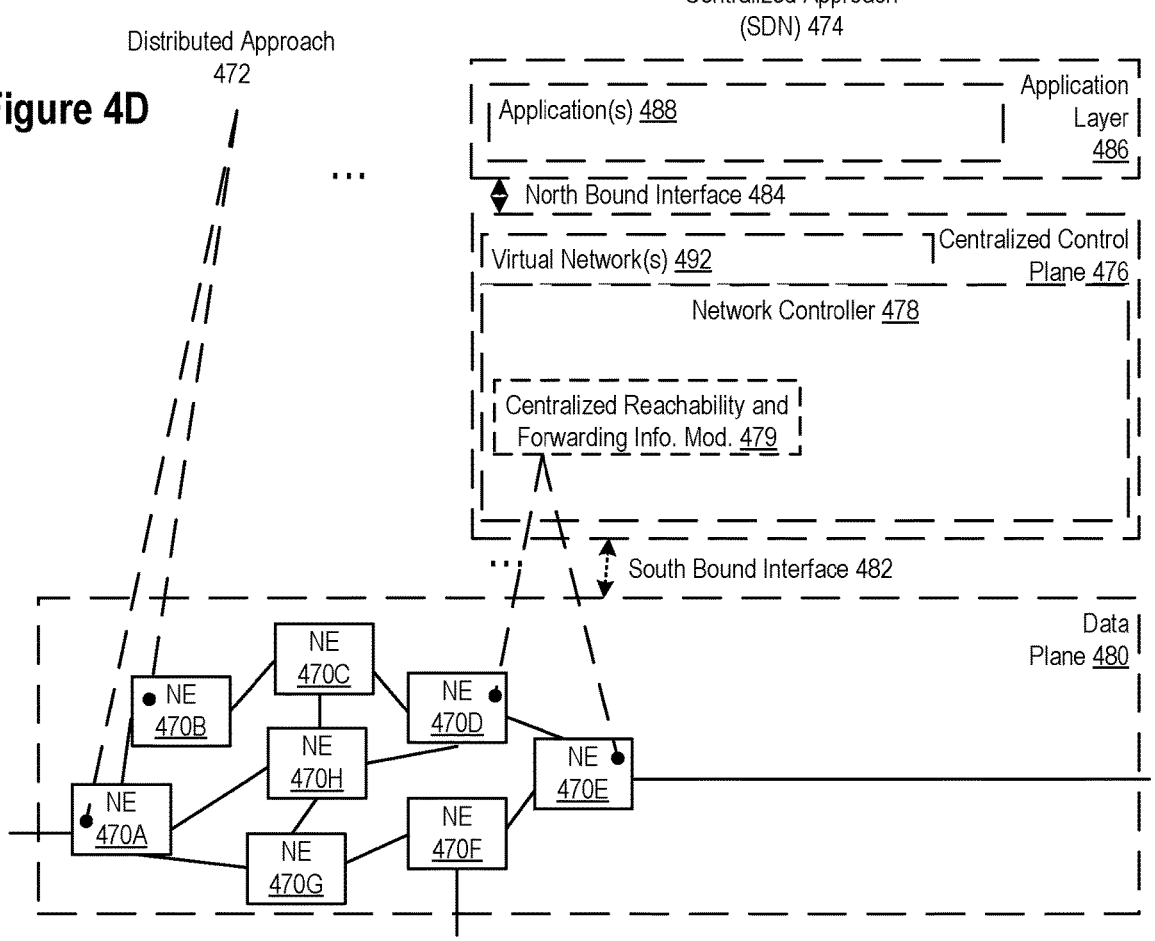
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the processor(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general-purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the processor(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
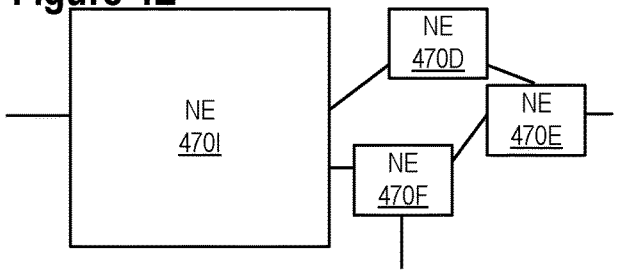
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
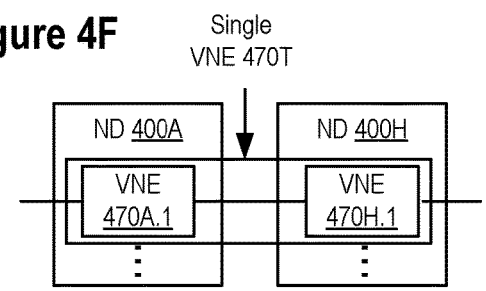
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
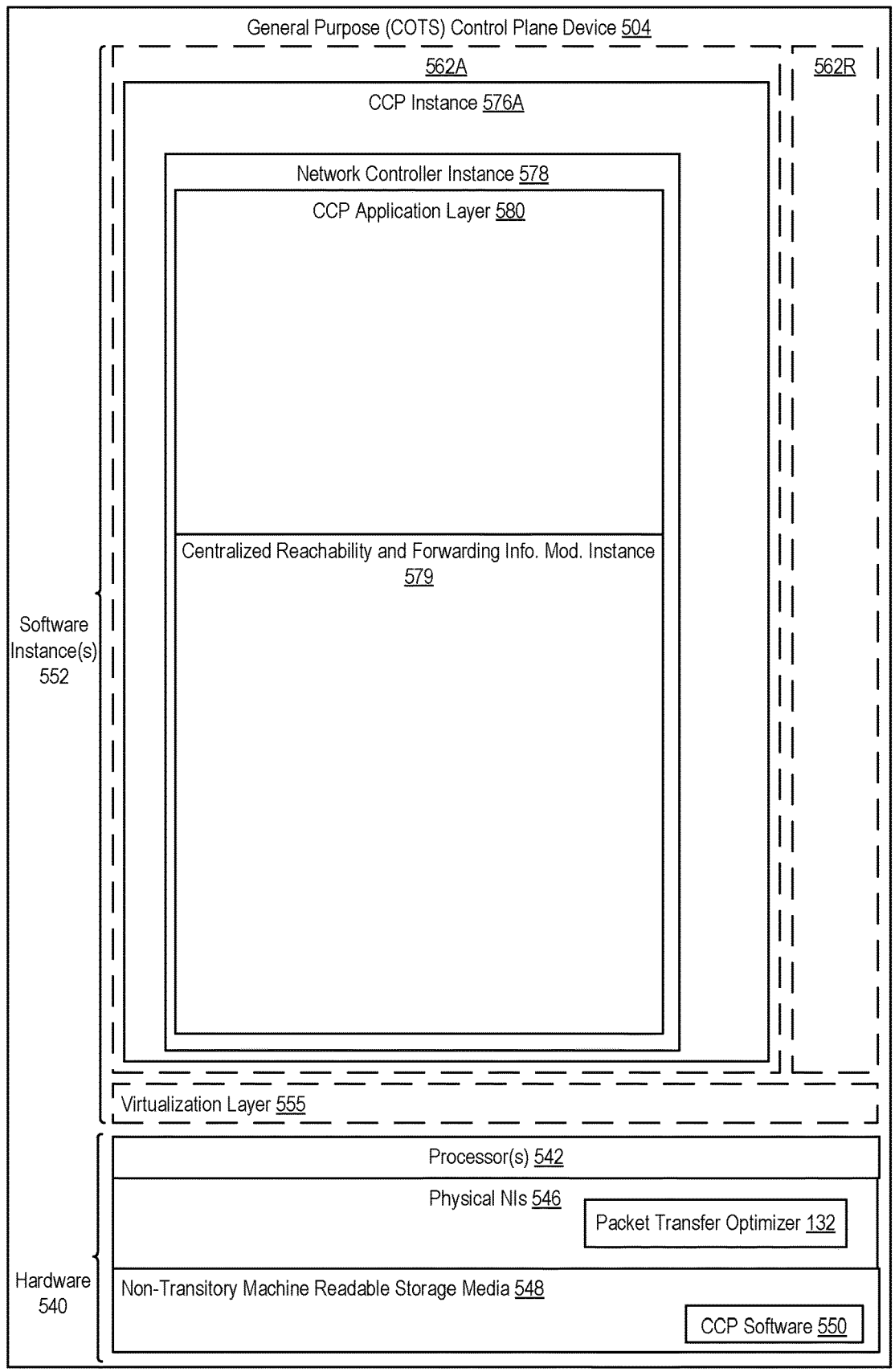
FIG. 5 illustrates a general-purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and physical NIs 546, as well as non-transitory machine readable storage media 548 having stored therein centralized control plane (CCP) software 550.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (VMM)) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user—interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electronic device that is coupled with a processing unit for processing packets, the method comprising:
   receiving a packet;
   determining based on one or more attributes of the packet that the packet is to be split; and
   responsive to determining that the packet is to be split,
      generating an identifier of the packet;
      splitting the packet into a first portion and a second portion, wherein the first portion is to be processed by the processing unit and the second portion is to be stored without being processed by the processing unit;
      adding the identifier to the first portion;
      sending the first portion of the packet toward the processing unit for processing; and
      storing the second portion of the packet.

2. The method of claim 1 further comprising:
   responsive to determining that the packet is to be split, storing information related to the splitting of the packet including the identifier.

3. The method of claim 2 further comprising:
   receiving an indication resulting from processing the first portion of the packet in the processing unit;
   determining that the indication includes a processed first portion of the packet resulting from the processing of the first portion by the processing unit; and
   responsive to determining that the indication includes a processed first portion of the packet,
      merging the processed first portion of the packet with the second portion of the packet to obtain a processed packet; and
      outputting the processed packet.

4. The method of claim 3, wherein the merging the processed first portion of the packet with the second portion of the packet is performed based on the information related to splitting of the packet.

5. The method of claim 3 further comprising:
   determining based on the indication that the packet is dropped; and
   responsive to determining that the packet is dropped, removing the second portion of the packet from storage.

6. The method of claim 1, wherein the sending the first portion to the processing unit for processing includes directly sending the first portion to the processing unit.

7. The method of claim 6, wherein the storing the second portion includes storing the second portion in a main memory associated with the processing unit.

8. The method of claim 1, wherein the sending the first portion to the processing unit for processing includes storing the first portion to a main memory associated with the processing unit.

9. The method of claim 8, wherein the storing the second portion includes storing the second portion in a buffer of the electronic device.

10. A non-transitory machine-readable storage medium comprising computer program code which, when executed by a computer, performs operations comprising:
    receiving a packet;
    determining based on one or more attributes of the packet that the packet is to be split; and
    responsive to determining that the packet is to be split,
       generating an identifier of the packet;
       splitting the packet into a first portion and a second portion, wherein the first portion is to be processed by a processing unit and the second portion is to be stored without being processed by the processing unit;
       adding the identifier to the first portion;
       sending the first portion of the packet toward the processing unit for processing; and
       storing the second portion of the packet.

11. An electronic device to be coupled with a processing unit for processing packets received through a network interface (NI) device, the NI device comprising:
    a non-transitory machine-readable storage medium that provides instructions that, when executed by a processor, will cause the NI device to perform operations to,
       receive a packet;
       determine based on one or more attributes of the packet that the packet is to be split; and
       responsive to determining that the packet is to be split,
          generate an identifier of the packet;
          split the packet into a first portion and a second portion, wherein the first portion is to be processed by the processing unit and the second portion is to be stored without being processed by the processing unit;

add the identifier to the first portion;
send the first portion of the packet toward the processing unit for processing; and
store the second portion of the packet.

12. The electronic device of claim 11, wherein the operations further comprise:
responsive to determining that the packet is to be split, to store information related to splitting of the packet including the identifier.

13. The electronic device of claim 12, wherein the operations further to:
receive an indication resulting from processing the first portion of the packet in the processing unit;
determine that the indication includes a processed first portion of the packet resulting from the processing of the first portion by the processing unit; and
responsive to determining that the indication includes a processed first portion of the packet,
merge the processed first portion of the packet with the second portion of the packet to obtain a processed packet; and
output the processed packet.

14. The electronic device of claim 13, wherein to merge the processed first portion of the packet with the second portion of the packet is performed based on the information related to splitting of the packet.

15. The electronic device of claim 13, wherein the operations further to:
determine based on the indication that the packet is dropped; and
responsive to determining that the packet is dropped, remove the second portion of the packet from storage.

16. The electronic device of claim 11, wherein to send the first portion to the processing unit directly sends the first portion to the processing unit.

17. The electronic device of any of claim 16, wherein to store the second portion stores the second portion in a main memory associated with the processing unit.

18. The electronic device of claim 11, wherein to send the first portion to the processing unit stores the first portion to a main memory associated with the processing unit.

* * * * *